US012302080B2

(12) United States Patent
Qi et al.

(10) Patent No.: US 12,302,080 B2
(45) Date of Patent: May 13, 2025

(54) BONE CONDUCTION SPEAKER AND COMPOUND VIBRATION DEVICE THEREOF

(71) Applicant: SHENZHEN SHOKZ CO., LTD., Guangdong (CN)

(72) Inventors: Xin Qi, Shenzhen (CN); Fengyun Liao, Shenzhen (CN); Jinbo Zheng, Shenzhen (CN); Qian Chen, Shenzhen (CN); Hao Chen, Shenzhen (CN); Yueqiang Wang, Shenzhen (CN); Haofeng Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 87 days.

(21) Appl. No.: 18/185,419

(22) Filed: Mar. 17, 2023

(65) Prior Publication Data

US 2023/0224644 A1 Jul. 13, 2023

Related U.S. Application Data

(63) Continuation of application No. 17/218,279, filed on Mar. 31, 2021, now Pat. No. 11,611,834, which is a (Continued)

(30) Foreign Application Priority Data

Dec. 23, 2011 (CN) ......................... 201110438083.9
Aug. 24, 2018 (CN) ......................... 201810975515.1

(51) Int. Cl.
*H04R 9/06* (2006.01)
*H04R 1/00* (2006.01)
(Continued)

(52) U.S. Cl.
CPC ............... *H04R 9/063* (2013.01); *H04R 1/00* (2013.01); *H04R 1/10* (2013.01); *H04R 9/02* (2013.01);
(Continued)

(58) Field of Classification Search
CPC . H04R 9/063; H04R 1/00; H04R 1/10; H04R 9/02; H04R 9/025; H04R 9/066;
(Continued)

(56) References Cited

U.S. PATENT DOCUMENTS 2,075,196 A 3/1937 Hand
4,418,248 A * 11/1983 Mathis .................... H04R 1/26 381/373
(Continued)

FOREIGN PATENT DOCUMENTS

CN 1842019 A 10/2006
CN 1976541 A 6/2007
(Continued)

OTHER PUBLICATIONS

Paula Henry et al., Bone Conduction: Anatomy, Physiology, and Communication, Army Research Laboratory, 2007, 206 pages.
(Continued)

*Primary Examiner* — Norman Yu
(74) *Attorney, Agent, or Firm* — Metis IP LLC

(57) ABSTRACT

The present disclosure relates to a bone conduction speaker and its compound vibration device. The compound vibration device comprises a vibration conductive plate and a vibration board, the vibration conductive plate is set to be the first torus, where at least two first rods inside it converge to its center; the vibration board is set as the second torus, where at least two second rods inside it converge to its center. The vibration conductive plate is fixed with the vibration board; the first torus is fixed on a magnetic system, and the second
(Continued)

torus comprises a fixed voice coil, which is driven by the magnetic system. The bone conduction speaker in the present disclosure and its compound vibration device adopt the fixed vibration conductive plate and vibration board, making the technique simpler with a lower cost; because the two adjustable parts in the compound vibration device can adjust both low frequency and high frequency area, the frequency response obtained is flatter and the sound is broader.

20 Claims, 18 Drawing Sheets

Related U.S. Application Data continuation-in-part of application No. 17/170,817, filed on Feb. 8, 2021, now Pat. No. 11,395,072, which is a continuation of application No. 17/161,717, filed on Jan. 29, 2021, now Pat. No. 11,399,234, which is a continuation-in-part of application No. 16/159,070, filed on Oct. 12, 2018, now Pat. No. 10,911,876, which is a continuation of application No. 15/197, 050, filed on Jun. 29, 2016, now Pat. No. 10,117,026, which is a continuation of application No. 14/513, 371, filed on Oct. 14, 2014, now Pat. No. 9,402,116, which is a continuation of application No. 13/719, 754, filed on Dec. 19, 2012, now Pat. No. 8,891,792, said application No. 17/161,717 is a continuation-in-part of application No. 16/833,839, filed on Mar. 30, 2020, now Pat. No. 11,399,245, which is a continuation of application No. 15/752,452, filed as application No. PCT/CN2015/086907 on Aug. 13, 2015, now Pat. No. 10,609,496, said application No. 17/218,279 is a continuation-in-part of application No. 16/950,876, filed on Nov. 17, 2020, now Pat. No. 12,105,357, which is a continuation of application No. PCT/CN2019/102394, filed on Aug. 24, 2019.

(51) Int. Cl.

| | |
|---|---|
| ***H04R 1/10*** | (2006.01) |
| ***H04R 9/02*** | (2006.01) |
| ***H04R 31/00*** | (2006.01) |
| *H04R 25/00* | (2006.01) |

(52) U.S. Cl.
CPC ............ *H04R 9/025* (2013.01); *H04R 9/066* (2013.01); *H04R 31/00* (2013.01); *H04R 25/606* (2013.01); *H04R 2460/13* (2013.01)

(58) Field of Classification Search
CPC ... H04R 31/00; H04R 25/606; H04R 2460/13
USPC ................................ 381/151, 326, 380, 162
See application file for complete search history.

(56) References Cited

U.S. PATENT DOCUMENTS 4,791,673 A 12/1988 Schreiber
5,127,060 A * 6/1992 Paddock ................ H04R 7/02 381/403
5,280,524 A 1/1994 Norris
5,673,328 A 9/1997 Wandl et al.
5,734,132 A 3/1998 Proni
5,745,209 A 4/1998 Khantzis
5,790,684 A * 8/1998 Niino ................ H04M 1/6058 381/174
6,389,148 B1 5/2002 Yoo et al.
6,456,721 B1 9/2002 Fukuda
6,668,065 B2 12/2003 Lee et al.
6,738,485 B1 5/2004 Boesen
6,850,138 B1 2/2005 Sakai
7,289,767 B2 10/2007 Lai
7,639,825 B2 12/2009 Fukuda
7,822,215 B2 10/2010 Carazo et al.
8,325,964 B2 12/2012 Weisman
8,433,082 B2 4/2013 Abolfathi
8,447,061 B2 5/2013 Lee
8,520,867 B2 8/2013 Koike et al.
8,526,641 B2 9/2013 Parker et al.
8,553,910 B1 10/2013 Dong et al.
8,660,278 B2 2/2014 Abolfathi et al.
8,699,742 B2 4/2014 Heiman et al.
8,737,649 B2 5/2014 Parker et al.
8,891,792 B2 11/2014 Qi et al.
8,908,891 B2 12/2014 Mersky
9,226,075 B2 12/2015 Lee
9,253,563 B2 2/2016 Fukuda
9,344,804 B2 * 5/2016 Chen ..................... H04R 15/00
9,742,887 B2 8/2017 Hosoi et al.
10,609,496 B2 3/2020 Liao et al.
11,140,497 B2 10/2021 Liao et al.
11,323,830 B2 5/2022 Liao et al.
11,323,832 B2 5/2022 Liao et al.
11,343,623 B2 5/2022 Liao et al.
11,343,624 B2 5/2022 Liao et al.
11,343,625 B2 5/2022 Liao et al.
11,368,800 B2 6/2022 Qi et al.
11,399,245 B2 7/2022 Liao et al.
11,438,717 B2 9/2022 Liao et al.
11,463,814 B2 10/2022 Qi et al.
11,570,560 B2 1/2023 Liao et al.
11,601,761 B2 3/2023 Qi et al.
11,611,837 B2 3/2023 Liao et al.
12,156,000 B2 11/2024 Liao et al.
2003/0012395 A1 1/2003 Fukuda
2003/0053651 A1 3/2003 Koura et al.
2004/0105566 A1 6/2004 Matsunaga et al.
2004/0131218 A1 7/2004 Dedieu et al.
2005/0129257 A1 6/2005 Tamura
2005/0254672 A1 11/2005 Kobayashi
2006/0018488 A1 1/2006 Viala et al.
2006/0098829 A1 * 5/2006 Kobayashi ........... H04R 1/1091 381/151
2006/0165246 A1 7/2006 Lee et al.
2006/0262954 A1 11/2006 Lee et al.
2006/0286998 A1 12/2006 Fukuda
2007/0053536 A1 3/2007 Westerkull
2007/0053542 A1 3/2007 Lee
2008/0074609 A1 3/2008 Ifergan
2008/0144874 A1 * 6/2008 Wu ....................... H04R 1/406 381/355
2008/0166007 A1 7/2008 Hankey et al.
2009/0097681 A1 4/2009 Puria et al.
2009/0209806 A1 8/2009 Hakansson
2009/0243964 A1 10/2009 Rottenkolber et al.
2009/0245553 A1 10/2009 Parker
2009/0285417 A1 11/2009 Shin et al.
2010/0046783 A1 2/2010 Huang
2010/0316235 A1 12/2010 Park et al.
2010/0329485 A1 12/2010 Fukuda
2011/0022119 A1 1/2011 Parker
2012/0020501 A1 * 1/2012 Lee ..................... H04R 1/1016 381/151
2012/0281861 A1 11/2012 Lin
2012/0286765 A1 11/2012 Heuvel et al.
2012/0302822 A1 11/2012 Van Himbeeck et al.
2013/0039520 A1 2/2013 Margolis et al.
2013/0121513 A1 5/2013 Adachi
2013/0156241 A1 6/2013 Jinton
2013/0201438 A1 8/2013 Gasparetto
2013/0259271 A1 10/2013 Miyoshi et al.
2013/0308798 A1 11/2013 Lee
2014/0064533 A1 3/2014 Kasic, II
2014/0185822 A1 7/2014 Kunimoto et al.
2014/0185837 A1 7/2014 Kunimoto et al.
2014/0270293 A1 9/2014 Ruppersberg et al.
2014/0274229 A1 9/2014 Fukuda
2015/0130945 A1 5/2015 Yu et al.

(56) References Cited

U.S. PATENT DOCUMENTS

| | | | |
|---|---|---|---|
| 2015/0208183 | A1 | 7/2015 | Bern |
| 2015/0230034 | A1 | 8/2015 | Kaplan |
| 2015/0256911 | A1 | 9/2015 | Lucas et al. |
| 2015/0264473 | A1 | 9/2015 | Fukuda |
| 2015/0319526 | A1 | 11/2015 | Kunimoto et al. |
| 2016/0037243 | A1 | 2/2016 | Lippert et al. |
| 2016/0127841 | A1 | 5/2016 | Horii |
| 2016/0246076 | A1 | 8/2016 | Wei |
| 2016/0295328 | A1 | 10/2016 | Park |
| 2017/0164088 | A1 | 6/2017 | Fukuda |
| 2017/0208398 | A1 | 7/2017 | Ruppersberg et al. |
| 2017/0374479 | A1 | 12/2017 | Qi et al. |
| 2019/0014425 | A1 | 1/2019 | Liao et al. |
| 2019/0204617 | A1 | 7/2019 | Yang et al. |
| 2019/0238971 | A1 | 8/2019 | Wakeland et al. |
| 2020/0228902 | A1 | 7/2020 | Liao et al. |
| 2021/0014587 | A1 | 1/2021 | Cai et al. |
| 2021/0165243 | A1 | 6/2021 | Wang et al. |
| 2021/0250694 | A1 | 8/2021 | Qi et al. |
| 2021/0250700 | A1 | 8/2021 | Qi et al. |
| 2022/0240029 | A1 | 7/2022 | Liao et al. |

FOREIGN PATENT DOCUMENTS

| | | | |
|---|---|---|---|
| CN | 102497612 | A | 6/2012 |
| CN | 202306037 | U | 7/2012 |
| CN | 202435598 | U | 9/2012 |
| CN | 203786416 | U | 8/2014 |
| CN | 204272346 | * | 4/2015 |
| CN | 105007551 | A | 10/2015 |
| CN | 105101019 | A | 11/2015 |
| CN | 105101020 | A | 11/2015 |
| CN | 105142077 | A | 12/2015 |
| CN | 204887455 | U | 12/2015 |
| CN | 205142506 | U | 4/2016 |
| CN | 205301727 | U | 6/2016 |
| CN | 206292473 | U | 6/2017 |
| CN | 206563855 | U | 10/2017 |
| CN | 206920741 | U | 1/2018 |
| CN | 207443120 | U | 6/2018 |
| CN | 207718105 | U | 8/2018 |
| CN | 109061902 | A | 12/2018 |
| CN | 208780926 | U | 4/2019 |
| CN | 208780932 | U | 4/2019 |
| CN | 208847981 | U | 5/2019 |
| CN | 209184747 | U | 7/2019 |
| EP | 1404146 | A1 | 3/2004 |
| EP | 1603362 | A1 | 12/2005 |
| EP | 2234413 | B1 | 11/2020 |
| JP | S5574290 | A | 6/1980 |
| JP | 07007797 | A | 1/1995 |
| JP | 2003264882 | A | 9/2003 |
| JP | 2004064457 | A | 2/2004 |
| JP | 2004158961 | A | 6/2004 |
| JP | 2005151183 | A | 6/2005 |
| JP | 2006025333 | A | 1/2006 |
| JP | 2006157318 | A | 6/2006 |
| JP | 2007129384 | A | 5/2007 |
| JP | 2008017398 | A | 1/2008 |
| JP | 2008054063 | A | 3/2008 |
| JP | 2011160175 | A | 8/2011 |
| JP | 2013243564 | A | 12/2013 |
| KR | 20000013328 | * | 3/2000 |
| KR | 20000013328 | A | 3/2000 |
| KR | 20010111653 | A | 12/2001 |
| KR | 20050030183 | A | 3/2005 |
| KR | 20070122104 | A | 12/2007 |
| KR | 20080101166 | A | 11/2008 |
| KR | 20090082999 | A | 8/2009 |
| KR | 20090091378 | A | 8/2009 |
| KR | 20110037483 | A | 4/2011 |
| KR | 200476572 | Y1 | 3/2015 |
| KR | 101819530 | B1 | 1/2018 |
| WO | 0219759 | A1 | 3/2002 |
| WO | 2006088410 | A1 | 8/2006 |
| WO | 2007034739 | A1 | 3/2007 |
| WO | 2010110713 | A1 | 9/2010 |
| WO | 2010114195 | A1 | 10/2010 |
| WO | 2019035558 | A1 | 2/2019 |

OTHER PUBLICATIONS

Office Action in Brazilian Application No. 11 2018 002854 1 mailed on Feb. 24, 2023, 8 pages.

Notice of Rejection in Japanese Application No. 2020-088413 mailed on Apr. 4, 2023, 9 pages.

First Office Action in Chinese Application No. 201110438083.9 mailed on Sep. 27, 2012, 10 pages.

The Extended European Search Report in European Application No. 12860348.7 mailed on Apr. 28, 2015, 7 pages.

International Search Report in PCT/CN2012/086513 mailed on Mar. 14, 2013, 5 pages.

Written Opinion in PCT/CN2012/086513 mailed on Mar. 14, 2013, 10 pages.

International Search Report in PCT/CN2015/086907 mailed on May 6, 2016, 10 pages.

Notice of Reasons for Rejection in Japanese Application No. 2018-506985 mailed on Sep. 3, 2019, 8 pages.

Notice of Reasons for Rejection in Japanese Application No. 2018-146019 mailed on Jul. 23, 2019, 8 pages.

Decision of Final Rejection in Japanese Application No. 2018-146019 mailed on Jan. 21, 2020, 9 pages.

Notice of Reasons for Rejection in Japanese Application No. 2018-146020 mailed on Jul. 23, 2019, 8 pages.

Notice of Reasons for Rejection in Japanese Application No. 2018-146021 mailed on Jul. 30, 2019, 8 pages.

Decision to Grant a Patent in Japanese Application No. 2018-146021 mailed on Jul. 21, 2020, 5 pages.

Brief Summary of a Notice of Preliminary Rejection in Republic of Korea Application No. 10-2018-7007115 mailed on May 20, 2021, 9 pages.

International Search Report in PCT/CN2019/102394 mailed on Nov. 28, 2019, 8 pages.

Written Opinion in PCT/CN2015/086907 mailed on May 6, 2016, 12 pages.

Written Opinion in PCT/CN2019/102394 mailed on Nov. 28, 2019, 10 pages.

Notice of Rejection in Japanese Application No. 2020-088413 mailed on Aug. 3, 2021, 7 pages.

M. Gripper et al., Using the Callsign Acquisition Test (CAT) to Compare the Speech Intelligibility of Air Versus Bone Conduction, International Journal of Industrial Ergonomics, 37(7): 631-641, 2007.

Martin L. Lenhardt et al., Measurement of Bone Conduction Levels for High Frequencies, International Tinnitus Journal, 8(1): 9-12, 2002.

The Extended European Search Report in European Application No. 21186537.3 mailed on Nov. 9, 2021, 9 pages.

Notice of Preliminary Rejection in Korean Application No. 10-2022-7003237 mailed on Apr. 13, 2022, 14 pages.

Notice of Reasons for Refusal in Japanese Application No. 2020-088413 mailed on Sep. 6, 2022, 11 pages.

The Second Notice of Preliminary Rejection in Korean Application No. 10-2022-7003237 mailed on Oct. 11, 2022, 14 pages.

Notice of Reasons for Refusal in Japanese Application No. 2021-179711 mailed on Oct. 18, 2022, 8 pages.

The Office Action in Brazilian Application No. BR102018067834-5 mailed on Jul. 5, 2024, 8 pages.

* cited by examiner

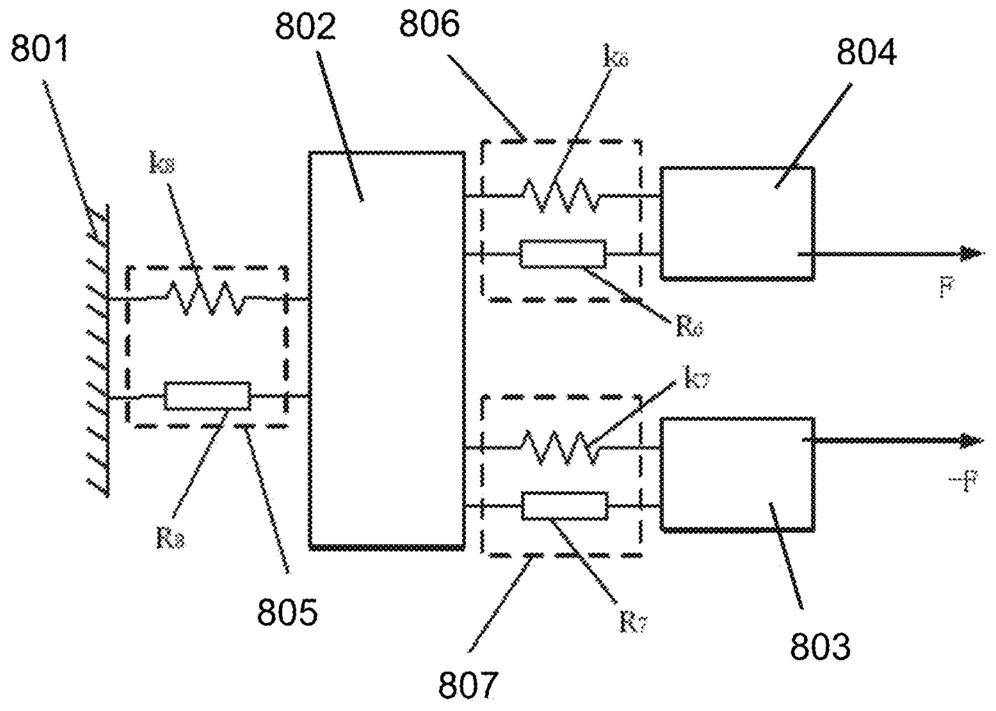
FIG. 8-A

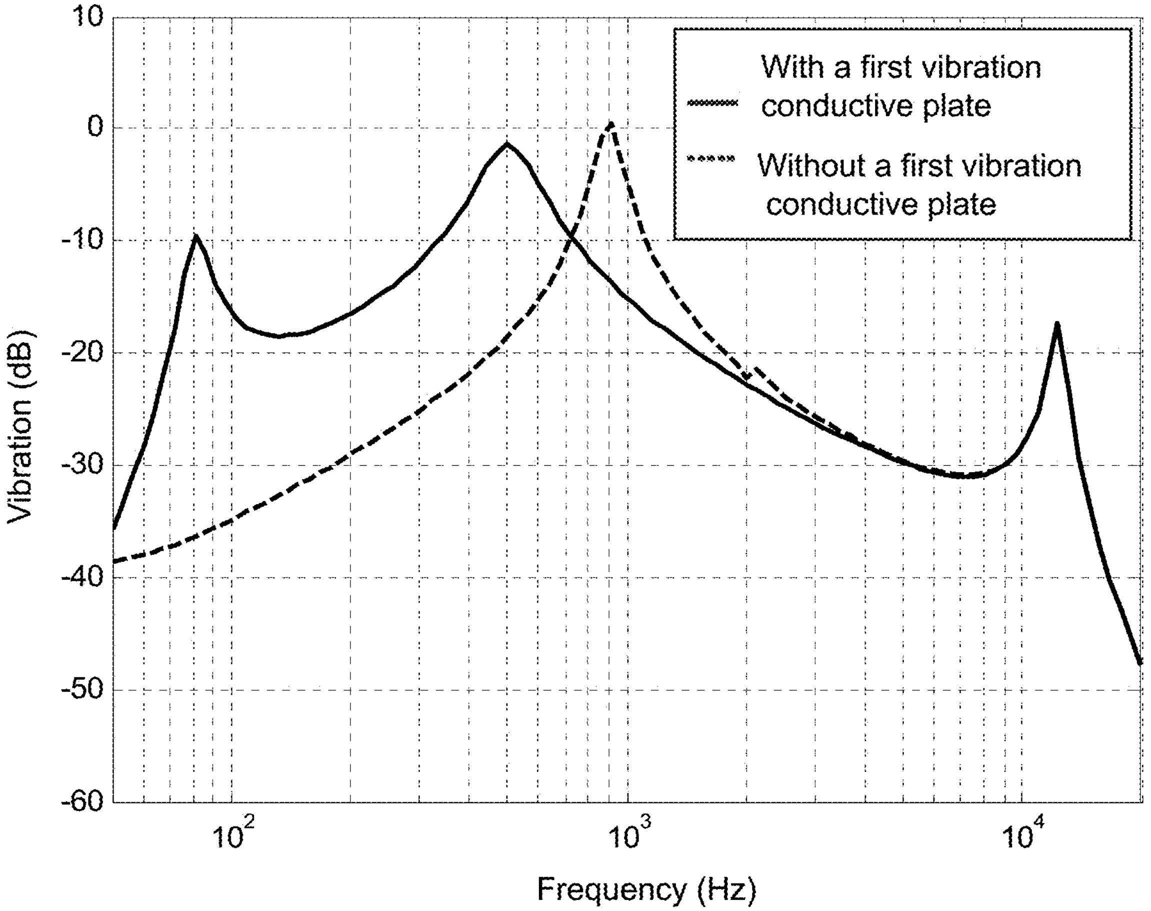
FIG. 8-B

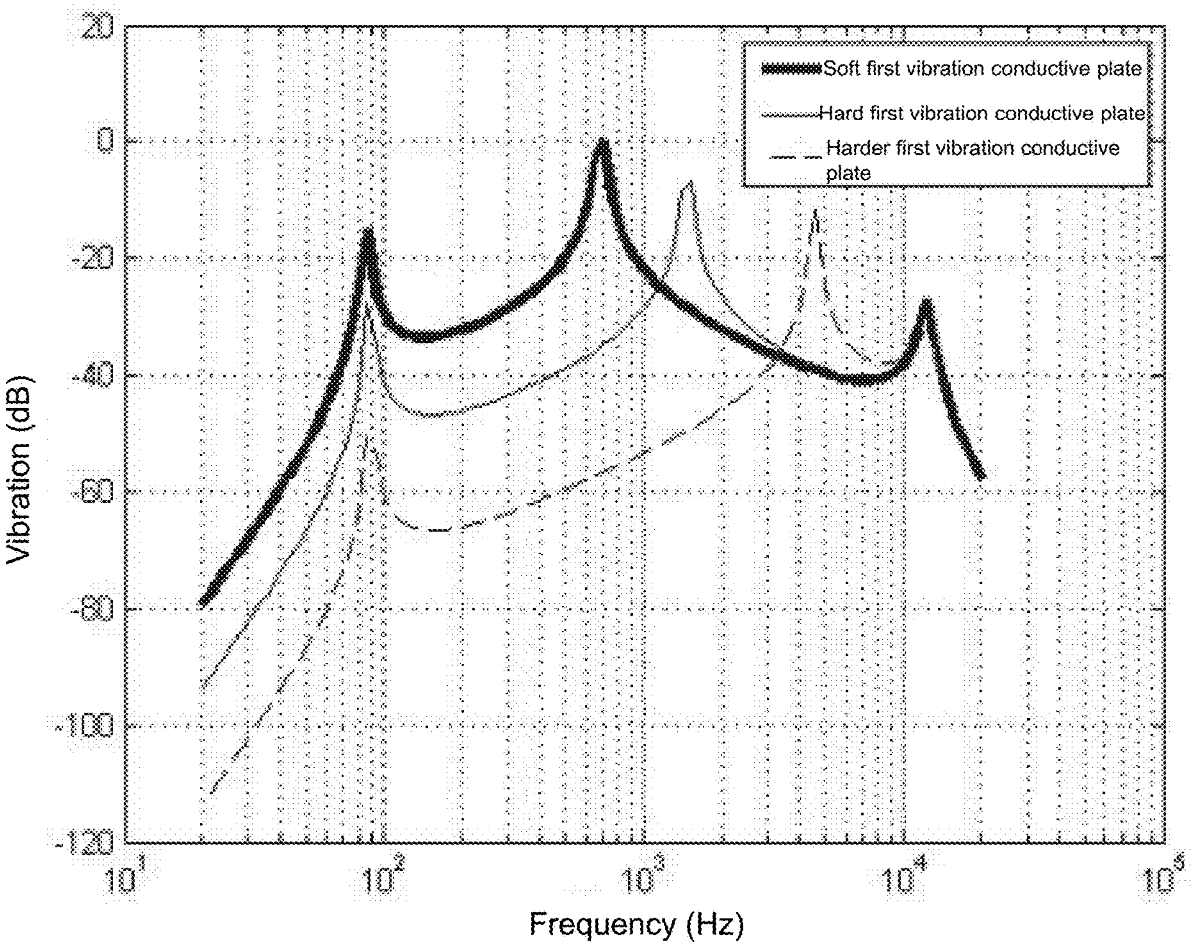
FIG. 8-C

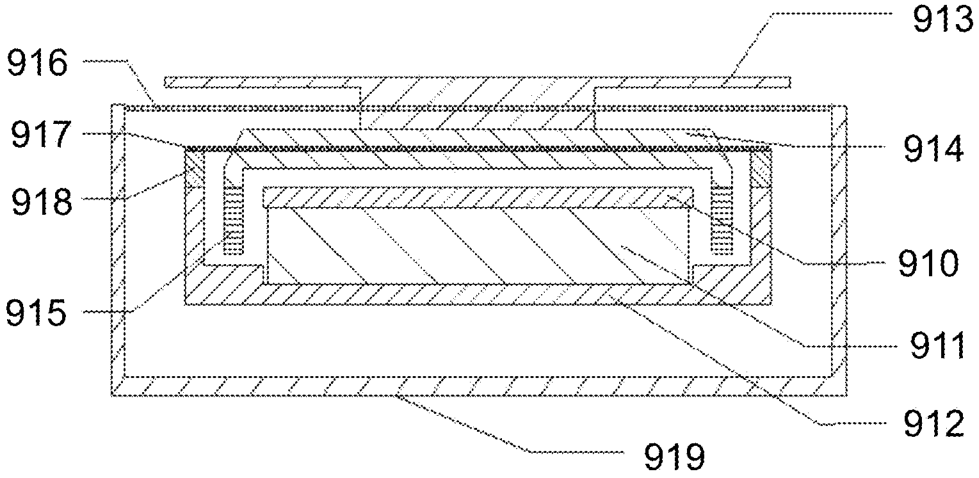
FIG. 9-A

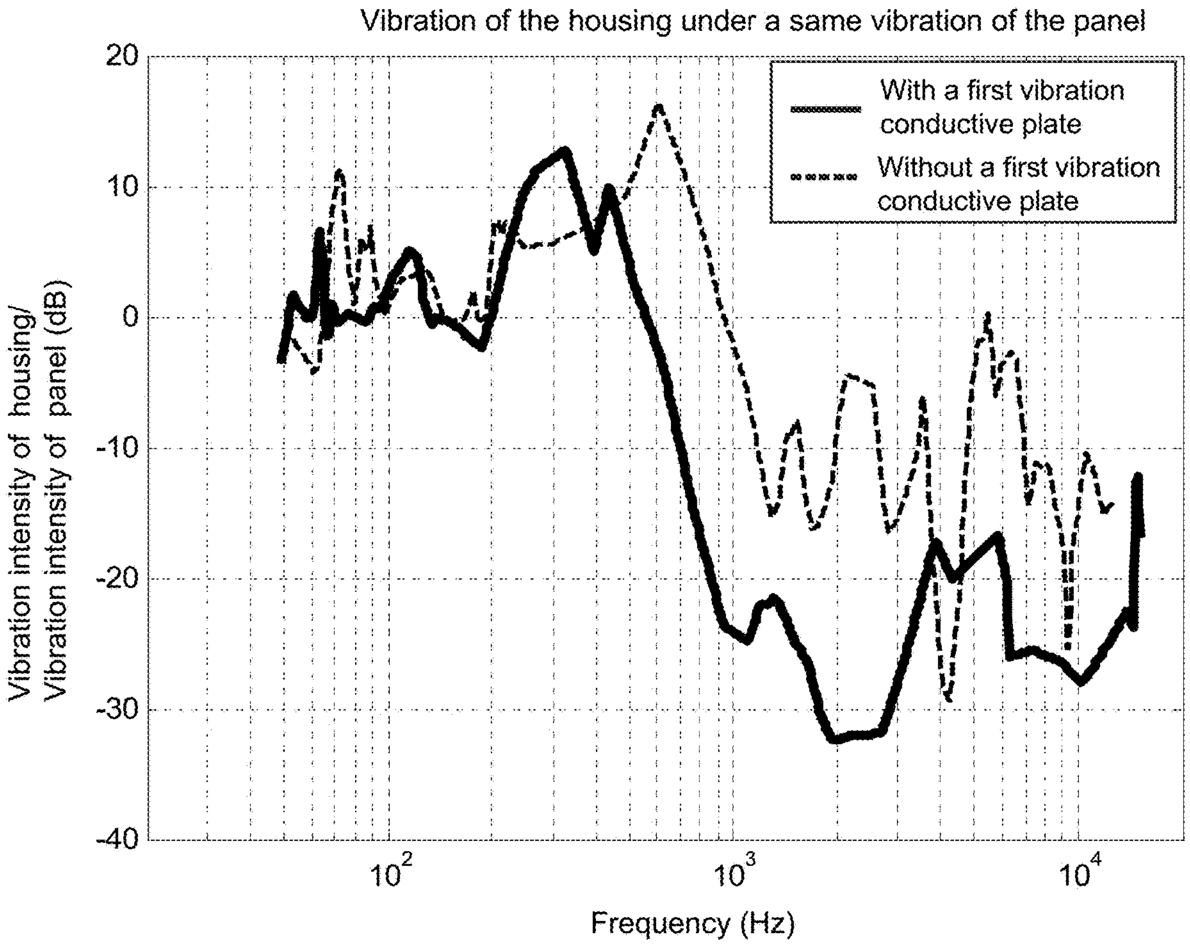
FIG. 9-B

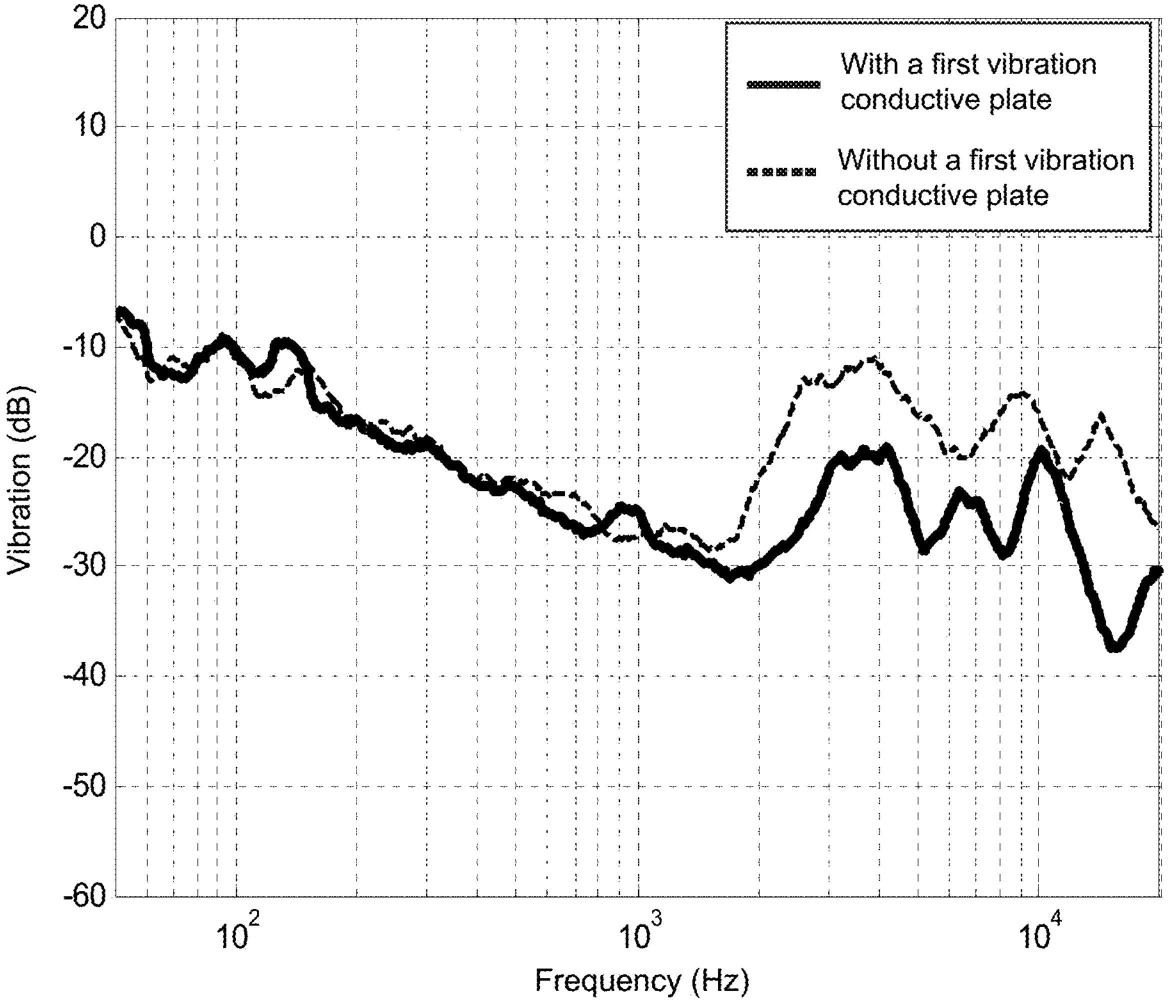
FIG. 9-C

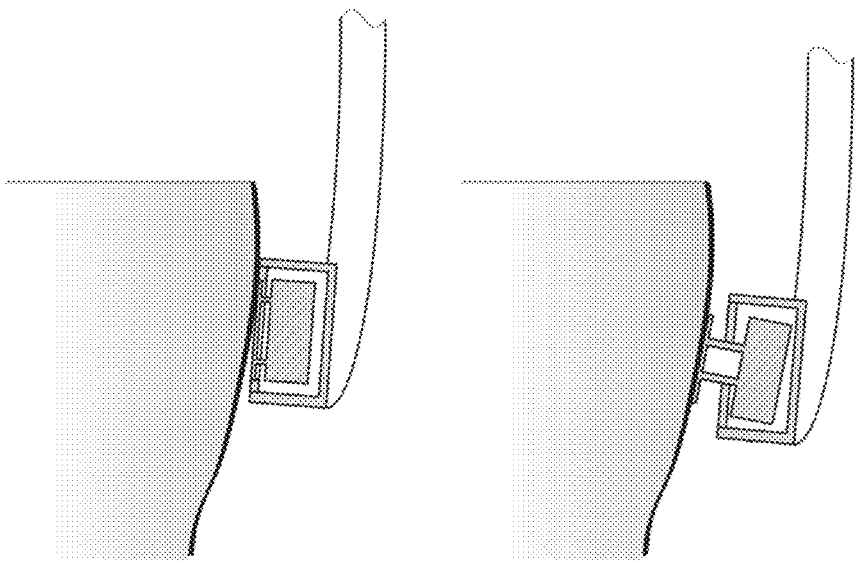
FIG. 11-A

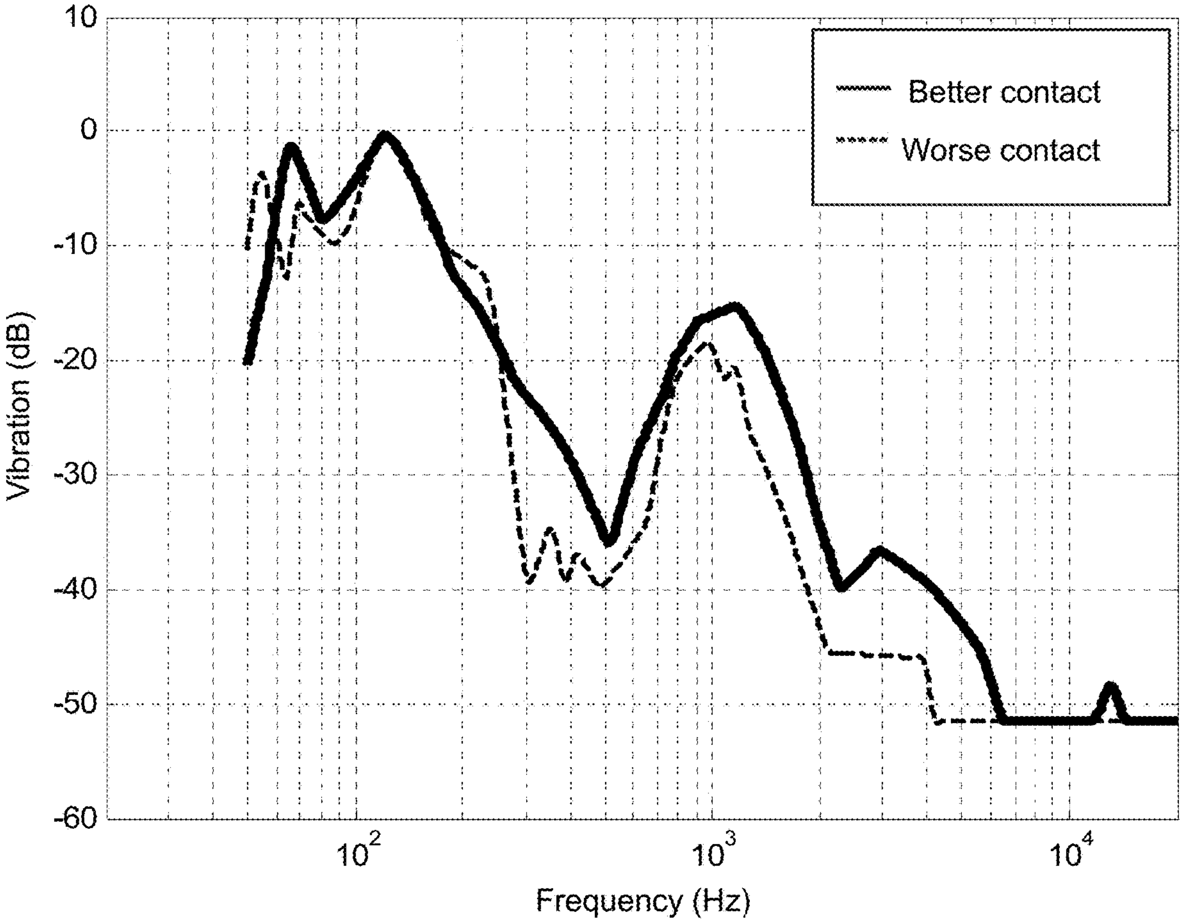
FIG. 11-B

BONE CONDUCTION SPEAKER AND COMPOUND VIBRATION DEVICE THEREOF

CROSS-REFERENCE TO RELATED APPLICATIONS

This application is a continuation application of U.S. patent application Ser. No. 17/218,279, filed on Mar. 31, 2021, which is a continuation-in-part application of U.S. patent application Ser. No. 17/170,817 (issued as U.S. Pat. No. 11,395,072), filed on Feb. 8, 2021, which is a continuation of U.S. patent application Ser. No. 17/161,717 (issued as U.S. Pat. No. 11,399,234), filed on Jan. 29, 2021, which is a continuation-in-part application of U.S. patent application Ser. No. 16/159,070 (issued as U.S. Pat. No. 10,911,876), filed on Oct. 12, 2018, which is a continuation of U.S. patent application Ser. No. 15/197,050 (issued as U.S. Pat. No. 10,117,026), filed on Jun. 29, 2016, which is a continuation of U.S. patent application Ser. No. 14/513,371 (issued as U.S. Pat. No. 9,402,116), filed on Oct. 14, 2014, which is a continuation of U.S. patent application Ser. No. 13/719,754 (issued as U.S. Pat. No. 8,891,792), filed on Dec. 19, 2012, which claims priority to Chinese Patent Application No. 201110438083.9, filed on Dec. 23, 2011; U.S. patent application Ser. No. 17/161,717, filed on Jan. 29, 2021 is also a continuation-in-part application of U.S. patent application Ser. No. 16/833,839 (issued as U.S. Pat. No. 11,399,245), filed on Mar. 30, 2020, which is a continuation of U.S. application Ser. No. 15/752,452 (issued as U.S. Pat. No. 10,609,496), filed on Feb. 13, 2018, which is a national stage entry under 35 U.S.C. § 371 of International Application No. PCT/CN2015/086907, filed on Aug. 13, 2015; U.S. patent application Ser. No. 17/218,279, filed on Mar. 31, 2021 is also a continuation-in-part of U.S. patent application Ser. No. 16/950,876, filed on Nov. 17, 2020, which is a continuation of International Application No. PCT/CN2019/102394, filed on Aug. 24, 2019, which claims priority of Chinese Patent Application No. 201810975515.1, filed on Aug. 24, 2018. Each of the above-referenced applications is hereby incorporated by reference.

TECHNICAL FIELD

The present disclosure relates to improvements on a bone conduction speaker and its components, in detail, relates to a bone conduction speaker and its compound vibration device, while the frequency response of the bone conduction speaker has been improved by the compound vibration device, which is composed of vibration boards and vibration conductive plates.

BACKGROUND

Based on the current technology, the principle that we can hear sounds is that the vibration transferred through the air in our external acoustic meatus, reaches to the ear drum, and the vibration in the ear drum drives our auditory nerves, makes us feel the acoustic vibrations. The current bone conduction speakers are transferring vibrations through our skin, subcutaneous tissues and bones to our auditory nerves, making us hear the sounds.

When the current bone conduction speakers are working, with the vibration of the vibration board, the shell body, fixing the vibration board with some fixers, will also vibrate together with it, thus, when the shell body is touching our post auricles, cheeks, forehead or other parts, the vibrations will be transferred through bones, making us hear the sounds clearly.

However, the frequency response curves generated by the bone conduction speakers with current vibration devices are shown as the two solid lines in FIG. 4. In ideal conditions, the frequency response curve of a speaker is expected to be a straight line, and the top plain area of the curve is expected to be wider, thus the quality of the tone will be better, and easier to be perceived by our ears. However, the current bone conduction speakers, with their frequency response curves shown as FIG. 4, have overtopped resonance peaks either in low frequency area or high frequency area, which has limited its tone quality a lot. Thus, it is very hard to improve the tone quality of current bone conduction speakers containing current vibration devices. The current technology needs to be improved and developed.

SUMMARY

The purpose of the present disclosure is providing a bone conduction speaker and its compound vibration device, to improve the vibration parts in current bone conduction speakers, using a compound vibration device composed of a vibration board and a vibration conductive plate to improve the frequency response of the bone conduction speaker, making it flatter, thus providing a wider range of acoustic sound.

The technical proposal of present disclosure is listed as below:

A compound vibration device in bone conduction speaker contains a vibration conductive plate and a vibration board, the vibration conductive plate is set as the first torus, where at least two first rods in it converge to its center. The vibration board is set as the second torus, where at least two second rods in it converge to its center. The vibration conductive plate is fixed with the vibration board. The first torus is fixed on a magnetic system, and the second torus contains a fixed voice coil, which is driven by the magnetic system.

In the compound vibration device, the magnetic system contains a baseboard, and an annular magnet is set on the board, together with another inner magnet, which is concentrically disposed inside this annular magnet, as well as an inner magnetic conductive plate set on the inner magnet, and the annular magnetic conductive plate set on the annular magnet. A grommet is set on the annular magnetic conductive plate to fix the first torus. The voice coil is set between the inner magnetic conductive plate and the annular magnetic plate.

In the compound vibration device, the number of the first rods and the second rods are both set to be three.

In the compound vibration device, the first rods and the second rods are both straight rods.

In the compound vibration device, there is an indentation at the center of the vibration board, which adapts to the vibration conductive plate.

In the compound vibration device, the vibration conductive plate rods are staggered with the vibration board rods.

In the compound vibration device, the staggered angles between rods are set to be 60 degrees.

In the compound vibration device, the vibration conductive plate is made of stainless steel, with a thickness of 0.1-0.2 mm, and, the width of the first rods in the vibration conductive plate is 0.5-1.0 mm; the width of the second rods in the vibration board is 1.6-2.6 mm, with a thickness of 0.8-1.2 mm.

In the compound vibration device, the number of the vibration conductive plate and the vibration board is set to be more than one. They are fixed together through their centers and/or torus.

A bone conduction speaker comprises a compound vibration device which adopts any methods stated above.

The bone conduction speaker and its compound vibration device as mentioned in the present disclosure, adopting the fixed vibration boards and vibration conductive plates, make the technique simpler with a lower cost. Also, because the two parts in the compound vibration device can adjust low frequency and high frequency areas, the achieved frequency response is flatter and wider, the possible problems like abrupt frequency responses or feeble sound caused by single vibration device will be avoided.

BRIEF DESCRIPTION OF THE DRAWINGS

FIG. 8-A illustrates an equivalent vibration model of the vibration portion of the bone conduction speaker according to some embodiments of the present disclosure;

FIG. 8-B illustrates a vibration response curve of the bone conduction speaker according to one specific embodiment of the present disclosure;

FIG. 8-C illustrates a vibration response curve of the bone conduction speaker according to one specific embodiment of the present disclosure;

FIG. 9-A illustrates a structure of the vibration generation portion of the bone conduction speaker according to one specific embodiment of the present disclosure;

FIG. 9-B illustrates a vibration response curve of the bone conduction speaker according to one specific embodiment of the present disclosure;

FIG. 9-C illustrates a sound leakage curve of the bone conduction speaker according to one specific embodiment of the present disclosure;

FIG. 11-A illustrates an application scenario of the bone conduction speaker according to one specific embodiment of the present disclosure;

FIG. 11-B illustrates a vibration response curve of the bone conduction speaker according to one specific embodiment of the present disclosure;

DETAILED DESCRIPTION

A detailed description of the implements of the present disclosure is stated here, together with attached figures.

Figure 1:
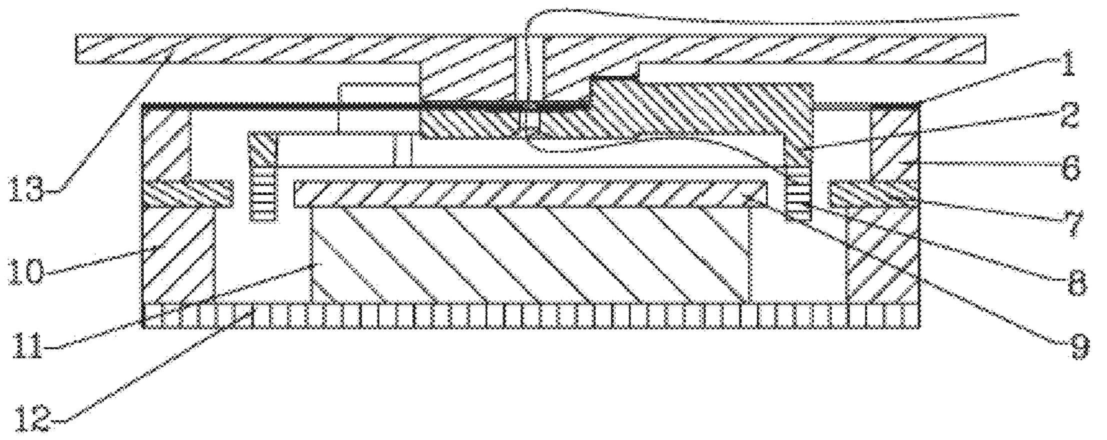
FIG. 1 illustrates a longitudinal section view of the bone conduction speaker in the present disclosure.
Figure 2:
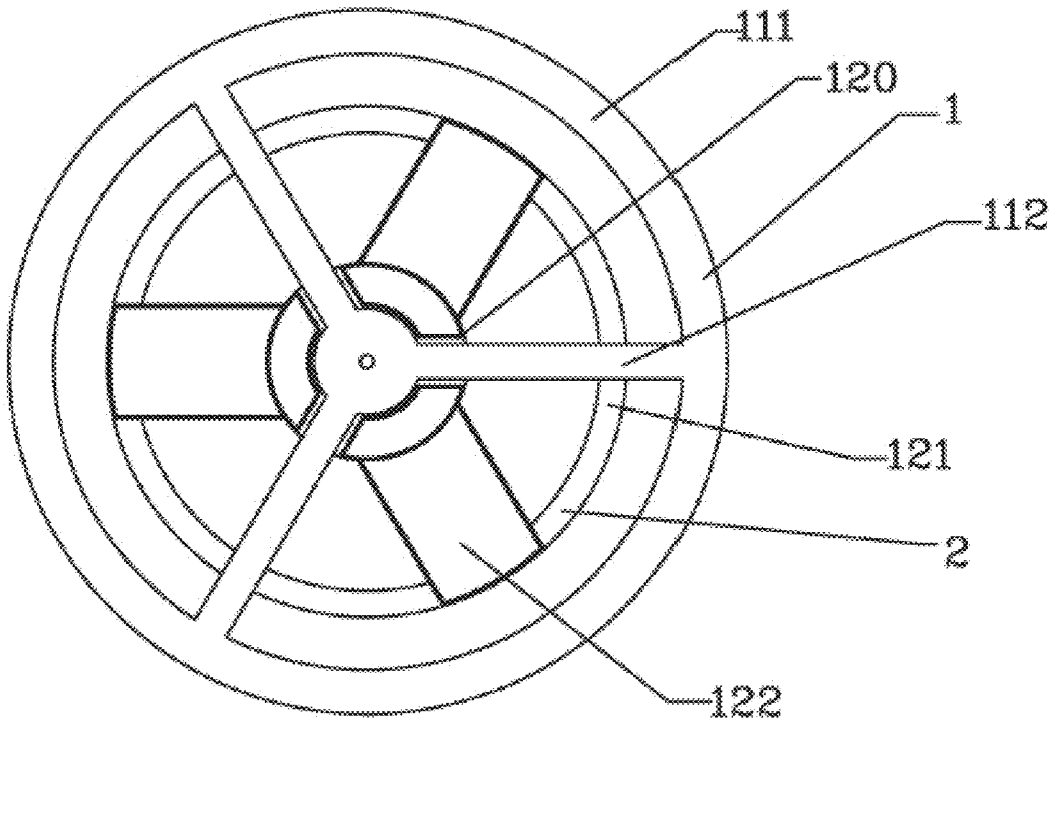
FIG. 2 illustrates a perspective view of the vibration parts in the bone conduction speaker in the present disclosure.
Figure 3:
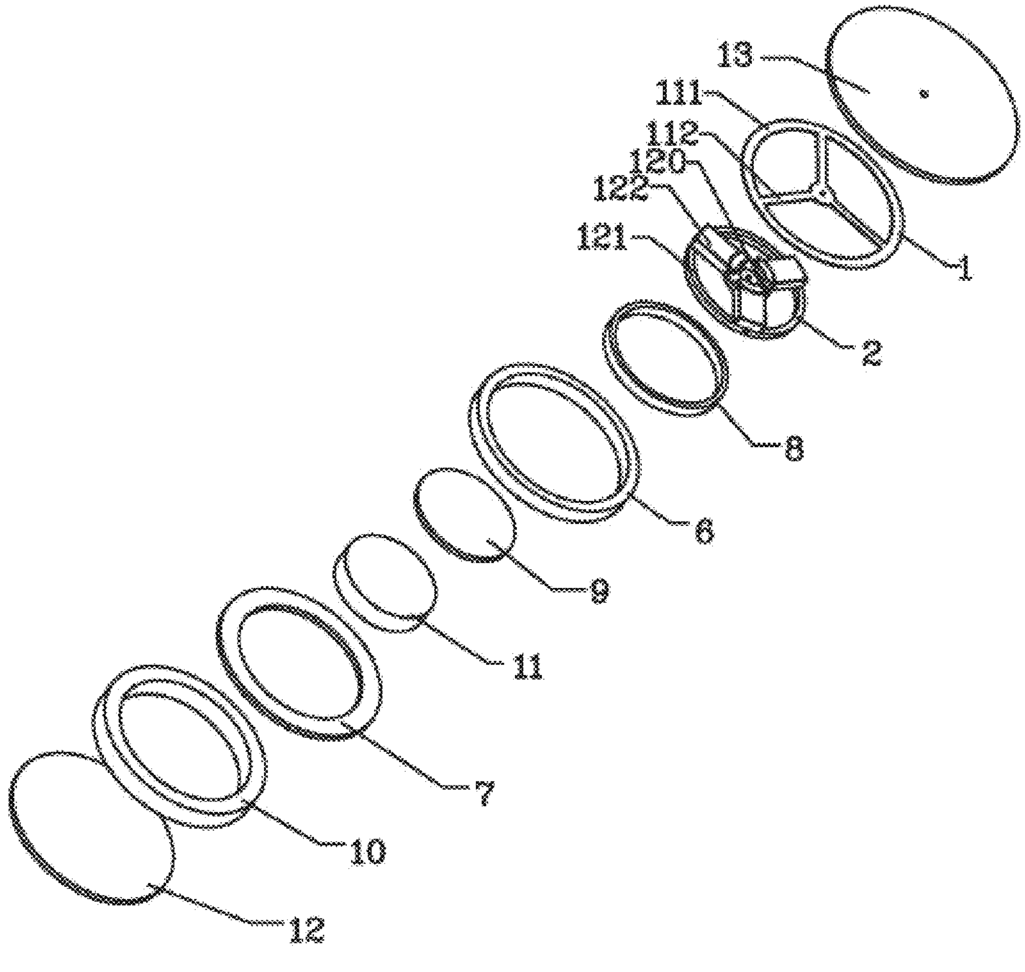
FIG. 3 illustrates an exploded perspective view of the bone conduction speaker in the present disclosure.

As shown in FIG. 1 and FIG. 3, the compound vibration device in the present disclosure of bone conduction speaker, comprises: the compound vibration parts composed of vibration conductive plate 1 and vibration board 2, the vibration conductive plate 1 is set as the first torus 111 and three first rods 112 in the first torus converging to the center of the torus, the converging center is fixed with the center of the vibration board 2. The center of the vibration board 2 is an indentation 120, which matches the converging center and the first rods. The vibration board 2 contains a second torus 121, which has a smaller radius than the vibration conductive plate 1, as well as three second rods 122, which is thicker and wider than the first rods 112. The first rods 112 and the second rods 122 are staggered, present but not limited to an angle of 60 degrees, as shown in FIG. 2. A better solution is, both the first and second rods are all straight rods.

Obviously the number of the first and second rods can be more than two, for example, if there are two rods, they can be set in a symmetrical position; however, the most economic design is working with three rods. Not limited to this rods setting mode, the setting of rods in the present disclosure can also be a spoke structure with four, five or more rods.

The vibration conductive plate 1 is very thin and can be more elastic, which is stuck at the center of the indentation 120 of the vibration board 2. Below the second torus 121 spliced in vibration board 2 is a voice coil 8. The compound vibration device in the present disclosure also comprises a bottom plate 12, where an annular magnet 10 is set, and an inner magnet 11 is set in the annular magnet 10 concentrically. An inner magnet conduction plate 9 is set on the top of the inner magnet 11, while annular magnet conduction plate 7 is set on the annular magnet 10, a grommet 6 is fixed above the annular magnet conduction plate 7, the first torus 111 of the vibration conductive plate 1 is fixed with the grommet 6. The whole compound vibration device is connected to the outside through a panel 13, the panel 13 is fixed with the vibration conductive plate 1 on its converging center, stuck and fixed at the center of both vibration conductive plate 1 and vibration board 2.

It should be noted that, both the vibration conductive plate and the vibration board can be set more than one, fixed with each other through either the center or staggered with both center and edge, forming a multilayer vibration structure, corresponding to different frequency resonance ranges, thus achieve a high tone quality earphone vibration unit with a gamut and full frequency range, despite of the higher cost.

The bone conduction speaker contains a magnet system, composed of the annular magnet conductive plate 7, annular magnet 10, bottom plate 12, inner magnet 11 and inner magnet conductive plate 9, because the changes of audio-frequency current in the voice coil 8 cause changes of magnet field, which makes the voice coil 8 vibrate. The compound vibration device is connected to the magnet system through grommet 6. The bone conduction speaker connects with the outside through the panel 13, being able to transfer vibrations to human bones.

Figure 6:
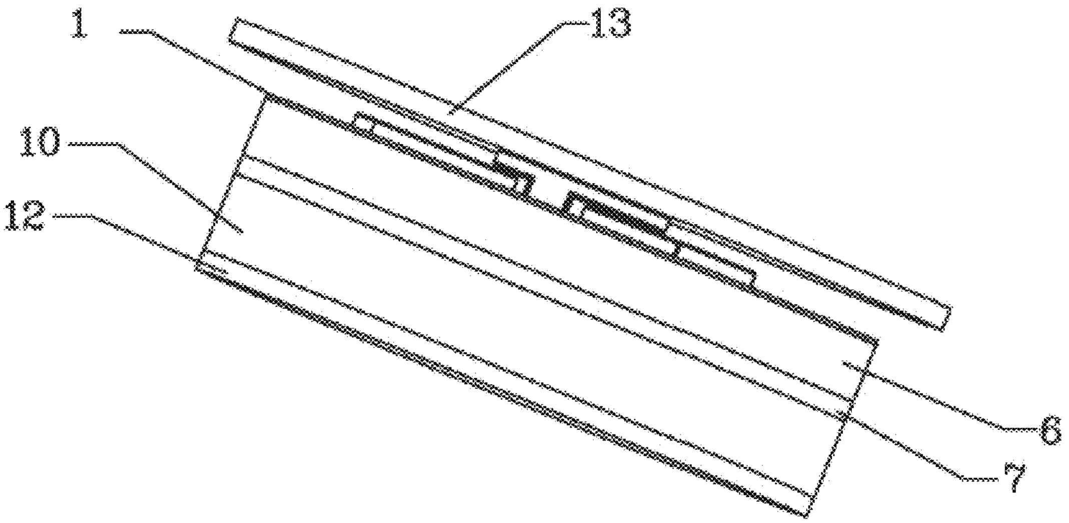
FIG. 6 illustrates a perspective view of the bone conduction speaker in the present disclosure.

In the better implement examples of the present bone conduction speaker and its compound vibration device, the magnet system, composed of the annular magnet conductive plate 7, annular magnet 10, inner magnet conduction plate 9, inner magnet 11 and bottom plate 12, interacts with the voice coil which generates changing magnet field intensity when its current is changing, and inductance changes accordingly, forces the voice coil 8 move longitudinally, then causes the vibration board 2 to vibrate, transfers the vibration to the vibration conductive plate 1, then, through the contact between panel 13 and the post ear, cheeks or forehead of the human beings, transfers the vibrations to human bones, thus generates sounds. A complete product unit is shown in FIG. 6.

Figure 5:
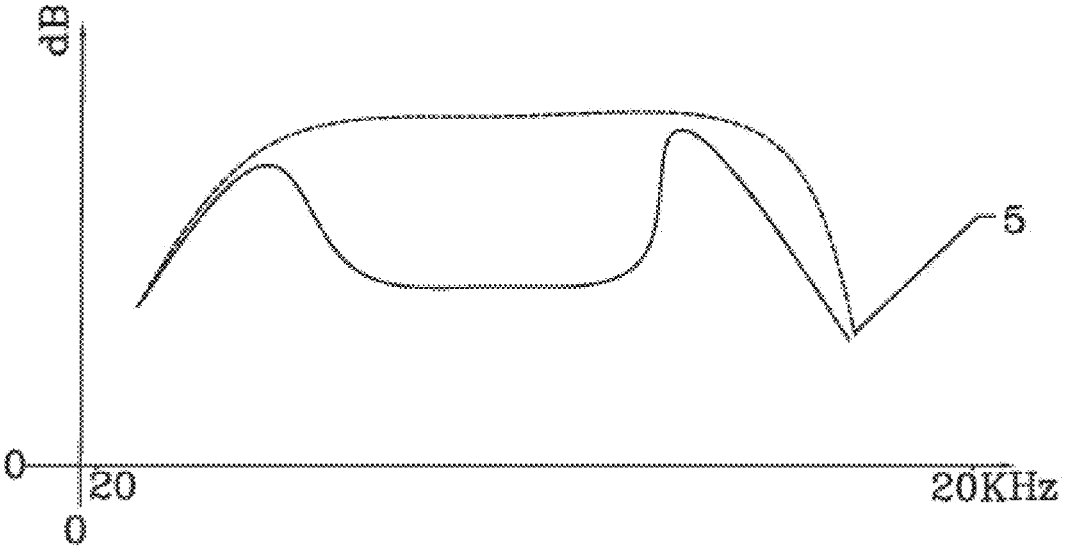
FIG. 5 illustrates frequency response curves of the bone conduction speakers of the vibration device in the present disclosure.

Through the compound vibration device composed of the vibration board and the vibration conductive plate, a frequency response shown in FIG. 5 is achieved. The double compound vibration generates two resonance peaks, whose positions can be changed by adjusting the parameters including sizes and materials of the two vibration parts, making the resonance peak in low frequency area move to the lower frequency area and the peak in high frequency move higher, finally generates a frequency response curve as the dotted line shown in FIG. 5, which is a flat frequency response curve generated in an ideal condition, whose resonance peaks are among the frequencies catchable with human ears. Thus, the device widens the resonance oscillation ranges, and generates the ideal voices.

In some embodiments, the stiffness of the vibration board may be larger than that of the vibration conductive plate. In some embodiments, the resonance peaks of the frequency response curve may be set within a frequency range perceivable by human ears, or a frequency range that a person's ears may not hear. Preferably, the two resonance peaks may be beyond the frequency range that a person may hear. More preferably, one resonance peak may be within the frequency range perceivable by human ears, and another one may be beyond the frequency range that a person may hear. More preferably, the two resonance peaks may be within the frequency range perceivable by human ears. Further preferably, the two resonance peaks may be within the frequency range perceivable by human ears, and the peak frequency may be in a range of 80 Hz-18000 Hz. Further preferably, the two resonance peaks may be within the frequency range perceivable by human ears, and the peak frequency may be in a range of 200 Hz-15000 Hz. Further preferably, the two resonance peaks may be within the frequency range perceivable by human ears, and the peak frequency may be in a range of 500 Hz-12000 Hz. Further preferably, the two resonance peaks may be within the frequency range perceivable by human ears, and the peak frequency may be in a range of 800 Hz-11000 Hz. There may be a difference between the frequency values of the resonance peaks. For example, the difference between the frequency values of the two resonance peaks may be at least 500 Hz, preferably 1000 Hz, more preferably 2000 Hz, and more preferably 5000 Hz. To achieve a better effect, the two resonance peaks may be within the frequency range perceivable by human ears, and the difference between the frequency values of the two resonance peaks may be at least 500 Hz. Preferably, the two resonance peaks may be within the frequency range perceivable by human ears, and the difference between the frequency values of the two resonance peaks may be at least 1000 Hz. More preferably, the two resonance peaks may be within the frequency range perceivable by human ears, and the difference between the frequency values of the two resonance peaks may be at least 2000 Hz. More preferably, the two resonance peaks may be within the frequency range perceivable by human ears, and the difference between the frequency values of the two resonance peaks may be at least 3000 Hz. Moreover, more preferably, the two resonance peaks may be within the frequency range perceivable by human ears, and the difference between the frequency values of the two resonance peaks may be at least 4000 Hz. One resonance peak may be within the frequency range perceivable by human ears, another one may be beyond the frequency range that a person may hear, and the difference between the frequency values of the two resonance peaks may be at least 500 Hz. Preferably, one resonance peak may be within the frequency range perceivable by human ears, another one may be beyond the frequency range that a person may hear, and the difference between the frequency values of the two resonance peaks may be at least 1000 Hz. More preferably, one resonance peak may be within the frequency range perceivable by human ears, another one may be beyond the frequency range that a person may hear, and the difference between the frequency values of the two resonance peaks may be at least 2000 Hz. More preferably, one resonance peak may be within the frequency range perceivable by human ears, another one may be beyond the frequency range that a person may hear, and the difference between the frequency values of the two resonance peaks may be at least 3000 Hz. Moreover, more preferably, one resonance peak may be within the frequency range perceivable by human ears, another one may be beyond the frequency range that a person may hear, and the difference between the frequency values of the two resonance peaks may be at least 4000 Hz. Both resonance peaks may be within the frequency range of 5 Hz-30000 Hz, and the difference between the frequency values of the two resonance peaks may be at least 400 Hz. Preferably, both resonance peaks may be within the frequency range of 5 Hz-30000 Hz, and the difference between the frequency values of the two resonance peaks may be at least 1000 Hz. More preferably, both resonance peaks may be within the frequency range of 5 Hz-30000 Hz, and the difference between the frequency values of the two resonance peaks may be at least 2000 Hz. More preferably, both resonance peaks may be within the frequency range of 5 Hz-30000 Hz, and the difference between the frequency values of the two resonance peaks may be at least 3000 Hz. Moreover, further preferably, both resonance peaks may be within the frequency range of 5 Hz-30000 Hz, and the difference between the frequency values of the two resonance peaks may be at least 4000 Hz. Both resonance peaks may be within the frequency range of 20 Hz-20000 Hz, and the difference between the frequency values of the two resonance peaks may be at least 400 Hz. Preferably, both resonance peaks may be within the frequency range of 20 Hz-20000 Hz, and the difference between the frequency values of the two resonance peaks may be at least 1000 Hz. More preferably, both resonance peaks may be within the frequency range of 20 Hz-20000 Hz, and the difference between the frequency values of the two resonance peaks may be at least 2000 Hz. More preferably, both resonance peaks may be within the frequency range of 20 Hz-20000 Hz, and the difference between the frequency values of the two resonance peaks may be at least 3000 Hz. And further preferably, both resonance peaks may be within the frequency range of 20 Hz-20000 Hz, and the difference between the frequency values of the two resonance peaks may be at least 4000 Hz. Both the two resonance peaks may be within the frequency range of 100 Hz-18000 Hz, and the difference between the frequency values of the two resonance peaks may be at least 400 Hz. Preferably, both resonance peaks may be within the frequency range of 100 Hz-18000 Hz, and the difference between the frequency values of the two resonance peaks may be at least 1000 Hz. More preferably, both resonance peaks may be within the frequency range of 100 Hz-18000 Hz, and the difference between the frequency values of the two resonance peaks may be at least 2000 Hz. More preferably, both resonance peaks may be within the frequency range of 100 Hz-18000 Hz, and the difference between the frequency values of the two resonance peaks may be at least 3000 Hz. And further preferably, both resonance peaks may be within the frequency range of 100 Hz-18000 Hz, and the difference between the frequency values of the two resonance peaks may be at least 4000 Hz. Both the two resonance peaks may be within the frequency range of 200 Hz-12000 Hz, and the difference between the frequency values of the two resonance peaks may be at least 400 Hz. Preferably, both resonance peaks may be within the frequency range of 200 Hz-12000 Hz, and the difference between the frequency values of the two resonance peaks may be at least 1000 Hz. More preferably, both resonance peaks may be within the frequency range of 200 Hz-12000 Hz, and the difference between the frequency values of the two resonance peaks may be at least 2000 Hz. More preferably, both resonance peaks may be within the frequency range of 200 Hz-12000 Hz, and the difference between the frequency values of the two resonance peaks may be at least 3000 Hz. And further preferably, both resonance peaks may be within the frequency range of 200 Hz-12000 Hz, and the difference between the frequency values of the two resonance peaks may be at least 4000 Hz. Both the two resonance peaks may be within the frequency range of 500 Hz-10000 Hz, and the difference between the frequency values of the two resonance peaks may be at least 400 Hz. Preferably, both resonance peaks may be within the frequency range of 500 Hz-10000 Hz, and the difference between the frequency values of the two resonance peaks may be at least 1000 Hz. More preferably, both resonance peaks may be within the frequency range of 500 Hz-10000 Hz, and the difference between the frequency values of the two resonance peaks may be at least 2000 Hz. More preferably, both resonance peaks may be within the frequency range of 500 Hz-10000 Hz, and the difference between the frequency values of the two resonance peaks may be at least 3000 Hz. And further preferably, both resonance peaks may be within the frequency range of 500 Hz-10000 Hz, and the difference between the frequency values of the two resonance peaks may be at least 4000 Hz. This may broaden the range of the resonance response of the speaker, thus obtaining a more ideal sound quality. It should be noted that in actual applications, there may be multiple vibration conductive plates and vibration boards to form multi-layer vibration structures corresponding to different ranges of frequency response, thus obtaining diatonic, full-ranged and high-quality vibrations of the speaker, or may make the frequency response curve meet requirements in a specific frequency range. For example, to satisfy the requirement of normal hearing, a bone conduction hearing aid may be configured to have a transducer including one or more vibration boards and vibration conductive plates with a resonance frequency in a range of 100 Hz-10000 Hz.

In the better implement examples, but, not limited to these examples, it is adopted that, the vibration conductive plate can be made by stainless steels, with a thickness of 0.1-0.2 mm, and when the middle three rods of the first rods group in the vibration conductive plate have a width of 0.5-1.0 mm, the low frequency resonance oscillation peak of the bone conduction speaker is located between 300 and 900 Hz. And, when the three straight rods in the second rods group have a width between 1.6 and 2.6 mm, and a thickness between 0.8 and 1.2 mm, the high frequency resonance oscillation peak of the bone conduction speaker is between 7500 and 9500 Hz. Also, the structures of the vibration conductive plate and the vibration board is not limited to three straight rods, as long as their structures can make a suitable flexibility to both vibration conductive plate and vibration board, cross-shaped rods and other rod structures are also suitable. Of course, with more compound vibration parts, more resonance oscillation peaks will be achieved, and the fitting curve will be flatter and the sound wider. Thus, in the better implement examples, more than two vibration parts, including the vibration conductive plate and vibration board as well as similar parts, overlapping each other, is also applicable, just needs more costs.

Figure 7:
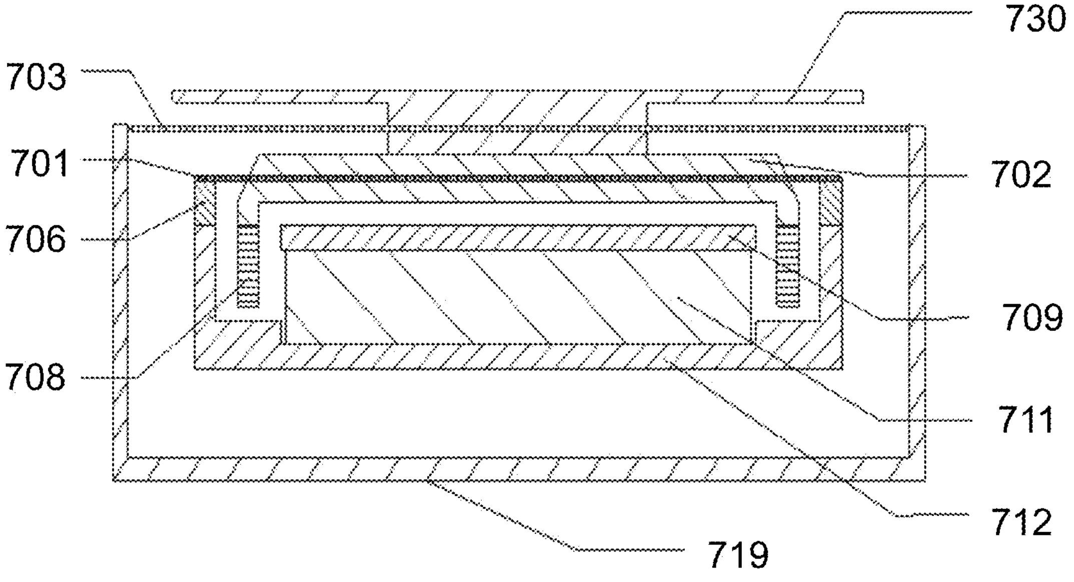
FIG. 7 illustrates a structure of the bone conduction speaker and the compound vibration device according to some embodiments of the present disclosure.

As shown in FIG. 7, in another embodiment, the compound vibration device (also referred to as "compound vibration system") may include a vibration board 702, a first vibration conductive plate 703, and a second vibration conductive plate 701. The first vibration conductive plate 703 may fix the vibration board 702 and the second vibration conductive plate 701 onto a housing 719. The compound vibration system including the vibration board 702, the first vibration conductive plate 703, and the second vibration conductive plate 701 may lead to no less than two resonance peaks and a smoother frequency response curve in the range of the auditory system, thus improving the sound quality of the bone conduction speaker. The equivalent model of the compound vibration system may be shown in FIG. 8-A:

For illustration purposes, 801 represents a housing, 802 represents a panel, 803 represents a voice coil, 804 represents a magnetic circuit system, 805 represents a first vibration conductive plate, 806 represents a second vibration conductive plate, and 807 represents a vibration board. The first vibration conductive plate, the second vibration conductive plate, and the vibration board may be abstracted as components with elasticity and damping; the housing, the panel, the voice coil and the magnetic circuit system may be abstracted as equivalent mass blocks. The vibration equation of the system may be expressed as:

$$m_6 x_6'' + R_6 (x_6 - x_5)' + k_6 (x_6 - x_5) = F, \quad (1)$$

$$x_7'' + R_7 (x_7 - x_5)' k_7 (x_7 - x_5) = -F, \quad (2)$$

$$m_5 x_5'' - R_6 (x_6 - x_5)' - R_7 (x_7 - x_5)' + R_8 x_5' + k_8 x_5 - k_6 (x_6 - x_5) - k_7 (x_7 - x_5) = 0, \quad (3)$$

wherein, F is a driving force, $k_6$ is an equivalent stiffness coefficient of the second vibration conductive plate, $k_7$ is an equivalent stiffness coefficient of the vibration board, $k_8$ is an equivalent stiffness coefficient of the first vibration conductive plate, $R_6$ is an equivalent damping of the second vibration conductive plate, $R_7$ is an equivalent damping of the vibration board, $R_8$ is an equivalent damp of the first vibration conductive plate, $m_5$ is a mass of the panel, $m_6$ is a mass of the magnetic circuit system, $m_7$ is a mass of the voice coil, $x_5$ is a displacement of the panel, $x_6$ is a displacement of the magnetic circuit system, $x_7$ is to displacement of the voice coil, and the amplitude of the panel 802 may be:

$$A_5 = \frac{\left(-m_6\omega^2(jR_7\omega - k_7) + m_7\omega^2(jR_6\omega - k_6)\right)}{\begin{pmatrix} (-m_5\omega^2 - jR_8\omega + k_8)(-m_6\omega^2 - jR_6\omega + k_6) \\ (-m_7\omega^2 - jR_7\omega + k_7) \\ -m_6\omega^2(-jR_6\omega + k_6)(-m_7\omega^2 - jR_7\omega + k_7) \\ -m_7\omega^2(-jR_7\omega + k_7)(-m_6\omega^2 - jR_6\omega + k_6) \end{pmatrix}} f_0, \tag{4}$$

wherein ω is an angular frequency of the vibration, and $f_0$ is a unit driving force.

The vibration system of the bone conduction speaker may transfer vibrations to a user via a panel (e.g., the panel 730 shown in FIG. 7). According to the equation (4), the vibration efficiency may relate to the stiffness coefficients of the vibration board, the first vibration conductive plate, and the second vibration conductive plate, and the vibration damping. Preferably, the stiffness coefficient of the vibration board $k_7$ may be greater than the second vibration coefficient $k_6$, and the stiffness coefficient of the vibration board $k_7$ may be greater than the first vibration factor $k_8$. The number of resonance peaks generated by the compound vibration system with the first vibration conductive plate may be more than the compound vibration system without the first vibration conductive plate, preferably at least three resonance peaks. More preferably, at least one resonance peak may be beyond the range perceivable by human ears. More preferably, the resonance peaks may be within the range perceivable by human ears. More further preferably, the resonance peaks may be within the range perceivable by human ears, and the frequency peak value may be no more than 18000 Hz. More preferably, the resonance peaks may be within the range perceivable by human ears, and the frequency peak value may be within the frequency range of 100 Hz-15000 Hz. More preferably, the resonance peaks may be within the range perceivable by human ears, and the frequency peak value may be within the frequency range of 200 Hz-12000 Hz. More preferably, the resonance peaks may be within the range perceivable by human ears, and the frequency peak value may be within the frequency range of 500 Hz-11000 Hz. There may be differences between the frequency values of the resonance peaks. For example, there may be at least two resonance peaks with a difference of the frequency values between the two resonance peaks no less than 200 Hz. Preferably, there may be at least two resonance peaks with a difference of the frequency values between the two resonance peaks no less than 500 Hz. More preferably, there may be at least two resonance peaks with a difference of the frequency values between the two resonance peaks no less than 1000 Hz. More preferably, there may be at least two resonance peaks with a difference of the frequency values between the two resonance peaks no less than 2000 Hz. More preferably, there may be at least two resonance peaks with a difference of the frequency values between the two resonance peaks no less than 5000 Hz. To achieve a better effect, all of the resonance peaks may be within the range perceivable by human ears, and there may be at least two resonance peaks with a difference of the frequency values between the two resonance peaks no less than 500 Hz. Preferably, all of the resonance peaks may be within the range perceivable by human ears, and there may be at least two resonance peaks with a difference of the frequency values between the two resonance peaks no less than 1000 Hz. More preferably, all of the resonance peaks may be within the range perceivable by human ears, and there may be at least two resonance peaks with a difference of the frequency values between the two resonance peaks no less than 2000 Hz. More preferably, all of the resonance peaks may be within the range perceivable by human ears, and there may be at least two resonance peaks with a difference of the frequency values between the two resonance peaks no less than 3000 Hz. More preferably, all of the resonance peaks may be within the range perceivable by human ears, and there may be at least two resonance peaks with a difference of the frequency values between the two resonance peaks no less than 4000 Hz. Two of the three resonance peaks may be within the frequency range perceivable by human ears, and another one may be beyond the frequency range that a person may hear, and there may be at least two resonance peaks with a difference of the frequency values between the two resonance peaks no less than 500 Hz. Preferably, two of the three resonance peaks may be within the frequency range perceivable by human ears, and another one may be beyond the frequency range that a person may hear, and there may be at least two resonance peaks with a difference of the frequency values between the two resonance peaks no less than 1000 Hz. More preferably, two of the three resonance peaks may be within the frequency range perceivable by human ears, and another one may be beyond the frequency range that a person may hear, and there may be at least two resonance peaks with a difference of the frequency values between the two resonance peaks no less than 2000 Hz. More preferably, two of the three resonance peaks may be within the frequency range perceivable by human ears, and another one may be beyond the frequency range that a person may hear, and there may be at least two resonance peaks with a difference of the frequency values between the two resonance peaks no less than 3000 Hz. More preferably, two of the three resonance peaks may be within the frequency range perceivable by human ears, and another one may be beyond the frequency range that a person may hear, and there may be at least two resonance peaks with a difference of the frequency values between the two resonance peaks no less than 4000 Hz. One of the three resonance peaks may be within the frequency range perceivable by human ears, and the other two may be beyond the frequency range that a person may hear, and there may be at least two resonance peaks with a difference of the frequency values between the two resonance peaks no less than 500 Hz. Preferably, one of the three resonance peaks may be within the frequency range perceivable by human ears, and the other two may be beyond the frequency range that a person may hear, and there may be at least two resonance peaks with a difference of the frequency values between the two resonance peaks no less than 1000 Hz. More preferably, one of the three resonance peaks may be within the frequency range perceivable by human ears, and the other two may be beyond the frequency range that a person may hear, and there may be at least two resonance peaks with a difference of the frequency values between the two resonance peaks no less than 2000 Hz. More preferably, one of the three resonance peaks may be within the frequency range perceivable by human ears, and the other two may be beyond the frequency range that a person may hear, and there may be at least two resonance peaks with a difference of the frequency values between the two resonance peaks no less than 3000 Hz. More preferably, one of the three resonance peaks may be within the frequency range perceivable by human ears, and the other two may be beyond the frequency range that a person may hear, and there may be at least two resonance peaks with a difference of the frequency values between the two resonance peaks no less than 4000 Hz. All the resonance peaks may be within the frequency range of 5 Hz-30000 Hz, and there may be at least two resonance peaks with a difference of the frequency values between the two resonance peaks of at least 400 Hz. Preferably, all the resonance peaks may be within the frequency range of 5 Hz-30000 Hz, and there may be at least two resonance peaks with a difference of the frequency values between the two resonance peaks of at least 1000 Hz. More preferably, all the resonance peaks may be within the frequency range of 5 Hz-30000 Hz, and there may be at least two resonance peaks with a difference of the frequency values between the two resonance peaks of at least 2000 Hz. More preferably, all the resonance peaks may be within the frequency range of 5 Hz-30000 Hz, and there may be at least two resonance peaks with a difference of the frequency values between the two resonance peaks of at least 3000 Hz. And further preferably, all the resonance peaks may be within the frequency range of 5 Hz-30000 Hz, and there may be at least two resonance peaks with a difference of the frequency values between the two resonance peaks of at least 4000 Hz. All the resonance peaks may be within the frequency range of 20 Hz-20000 Hz, and there may be at least two resonance peaks with a difference of the frequency values between the two resonance peaks of at least 400 Hz. Preferably, all the resonance peaks may be within the frequency range of 20 Hz-20000 Hz, and there may be at least two resonance peaks with a difference of the frequency values between the two resonance peaks of at least 1000 Hz. More preferably, all the resonance peaks may be within the frequency range of 20 Hz-20000 Hz, and there may be at least two resonance peaks with a difference of the frequency values between the two resonance peaks of at least 2000 Hz. More preferably, all the resonance peaks may be within the frequency range of 20 Hz-20000 Hz, and there may be at least two resonance peaks with a difference of the frequency values between the two resonance peaks of at least 3000 Hz. And further preferably, all the resonance peaks may be within the frequency range of 20 Hz-20000 Hz, and there may be at least two resonance peaks with a difference of the frequency values between the two resonance peaks of at least 4000 Hz. All the resonance peaks may be within the frequency range of 100 Hz-18000 Hz, and there may be at least two resonance peaks with a difference of the frequency values between the two resonance peaks of at least 400 Hz. Preferably, all the resonance peaks may be within the frequency range of 100 Hz-18000 Hz, and there may be at least two resonance peaks with a difference of the frequency values between the two resonance peaks of at least 1000 Hz. More preferably, all the resonance peaks may be within the frequency range of 100 Hz-18000 Hz, and there may be at least two resonance peaks with a difference of the frequency values between the two resonance peaks of at least 2000 Hz. More preferably, all the resonance peaks may be within the frequency range of 100 Hz-18000 Hz, and there may be at least two resonance peaks with a difference of the frequency values between the two resonance peaks of at least 3000 Hz. And further preferably, all the resonance peaks may be within the frequency range of 100 Hz-18000 Hz, and there may be at least two resonance peaks with a difference of the frequency values between the two resonance peaks of at least 4000 Hz. All the resonance peaks may be within the frequency range of 200 Hz-12000 Hz, and there may be at least two resonance peaks with a difference of the frequency values between the two resonance peaks of at least 400 Hz. Preferably, all the resonance peaks may be within the frequency range of 200 Hz-12000 Hz, and there may be at least two resonance peaks with a difference of the frequency values between the two resonance peaks of at least 1000 Hz. More preferably, all the resonance peaks may be within the frequency range of 200 Hz-12000 Hz, and there may be at least two resonance peaks with a difference of the frequency values between the two resonance peaks of at least 2000 Hz. More preferably, all the resonance peaks may be within the frequency range of 200 Hz-12000 Hz, and there may be at least two resonance peaks with a difference of the frequency values between the two resonance peaks of at least 3000 Hz. And further preferably, all the resonance peaks may be within the frequency range of 200 Hz-12000 Hz, and there may be at least two resonance peaks with a difference of the frequency values between the two resonance peaks of at least 4000 Hz. All the resonance peaks may be within the frequency range of 500 Hz-10000 Hz, and there may be at least two resonance peaks with a difference of the frequency values between the two resonance peaks of at least 400 Hz. Preferably, all the resonance peaks may be within the frequency range of 500 Hz-10000 Hz, and there may be at least two resonance peaks with a difference of the frequency values between the two resonance peaks of at least 1000 Hz. More preferably, all the resonance peaks may be within the frequency range of 500 Hz-10000 Hz, and there may be at least two resonance peaks with a difference of the frequency values between the two resonance peaks of at least 2000 Hz. More preferably, all the resonance peaks may be within the frequency range of 500 Hz-10000 Hz, and there may be at least two resonance peaks with a difference of the frequency values between the two resonance peaks of at least 3000 Hz. Moreover, further preferably, all the resonance peaks may be within the frequency range of 500 Hz-10000 Hz, and there may be at least two resonance peaks with a difference of the frequency values between the two resonance peaks of at least 4000 Hz. In one embodiment, the compound vibration system including the vibration board, the first vibration conductive plate, and the second vibration conductive plate may generate a frequency response as shown in FIG. 8-B. The compound vibration system with the first vibration conductive plate may generate three obvious resonance peaks, which may improve the sensitivity of the frequency response in the low-frequency range (about 600 Hz), obtain a smoother frequency response, and improve the sound quality.

The resonance peak may be shifted by changing a parameter of the first vibration conductive plate, such as the size and material, so as to obtain an ideal frequency response eventually. For example, the stiffness coefficient of the first vibration conductive plate may be reduced to a designed value, causing the resonance peak to move to a designed low frequency, thus enhancing the sensitivity of the bone conduction speaker in the low frequency, and improving the quality of the sound. As shown in FIG. 8-C, as the stiffness coefficient of the first vibration conductive plate decreases (i.e., the first vibration conductive plate becomes softer), the resonance peak moves to the low frequency region, and the sensitivity of the frequency response of the bone conduction speaker in the low frequency region gets improved. Preferably, the first vibration conductive plate may be an elastic plate, and the elasticity may be determined based on the material, thickness, structure, or the like. The material of the first vibration conductive plate may include but not limited to steel (for example but not limited to, stainless steel, carbon steel, etc.), light alloy (for example but not limited to, aluminum, beryllium copper, magnesium alloy, titanium alloy, etc.), plastic (for example but not limited to, polyethylene, nylon blow molding, plastic, etc.). It may be a single material or a composite material that achieve the same performance. The composite material may include but not limited to reinforced material, such as glass fiber, carbon fiber, boron fiber, graphite fiber, graphene fiber, silicon carbide fiber, aramid fiber, or the like. The composite material may also be other organic and/or inorganic composite materials, such as various types of glass fiber reinforced by unsaturated polyester and epoxy, fiberglass comprising phenolic resin matrix. The thickness of the first vibration conductive plate may be not less than 0.005 mm. Preferably, the thickness may be 0.005 mm-3 mm. More preferably, the thickness may be 0.01 mm-2 mm. More preferably, the thickness may be 0.01 mm-1 mm. Moreover, further preferably, the thickness may be 0.02 mm-0.5 mm. The first vibration conductive plate may have an annular structure, preferably including at least one annular ring, preferably, including at least two annular rings. The annular ring may be a concentric ring or a non-concentric ring and may be connected to each other via at least two rods converging from the outer ring to the center of the inner ring. More preferably, there may be at least one oval ring. More preferably, there may be at least two oval rings. Different oval rings may have different curvatures radiuses, and the oval rings may be connected to each other via rods. Further preferably, there may be at least one square ring. The first vibration conductive plate may also have the shape of a plate. Preferably, a hollow pattern may be configured on the plate. Moreover, more preferably, the area of the hollow pattern may be not less than the area of the non-hollow portion. It should be noted that the above-described material, structure, or thickness may be combined in any manner to obtain different vibration conductive plates. For example, the annular vibration conductive plate may have a different thickness distribution. Preferably, the thickness of the ring may be equal to the thickness of the rod. Further preferably, the thickness of the rod may be larger than the thickness of the ring. Moreover, still, further preferably, the thickness of the inner ring may be larger than the thickness of the outer ring.

When the compound vibration device is applied to the bone conduction speaker, the major applicable area is bone conduction earphones. Thus the bone conduction speaker adopting the structure will be fallen into the protection of the present disclosure.

The bone conduction speaker and its compound vibration device stated in the present disclosure, make the technique simpler with a lower cost. Because the two parts in the compound vibration device can adjust the low frequency as well as the high frequency ranges, as shown in FIG. 5, which makes the achieved frequency response flatter, and voice more broader, avoiding the problem of abrupt frequency response and feeble voices caused by single vibration device, thus broaden the application prospection of bone conduction speaker.

Figure 4:
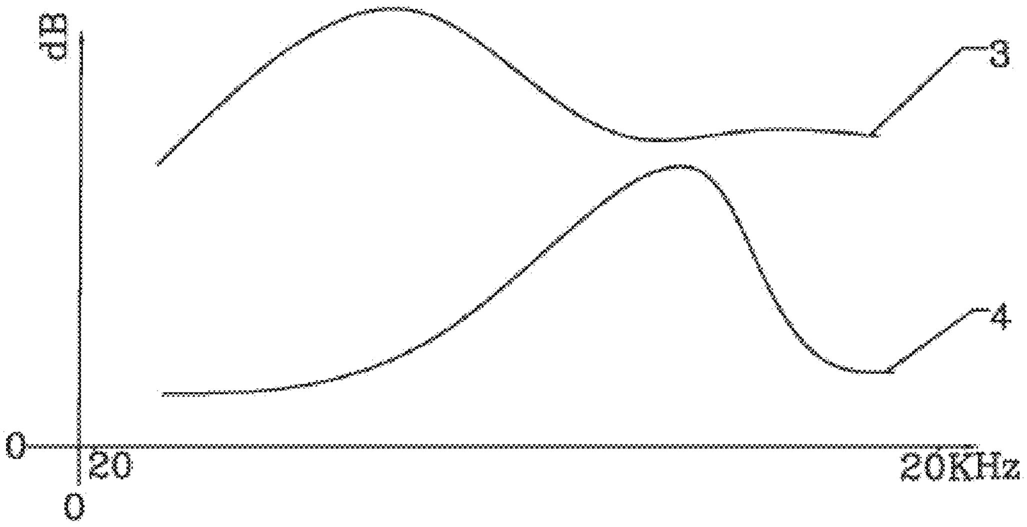
FIG. 4 illustrates frequency response curves of the bone conduction speakers of vibration device in the prior art.

In the prior art, the vibration parts did not take full account of the effects of every part to the frequency response, thus, although they could have the similar outlooks with the products described in the present disclosure, they will generate an abrupt frequency response, or feeble sound. And due to the improper matching between different parts, the resonance peak could have exceeded the human hearable range, which is between 20 Hz and 20 KHz. Thus, only one sharp resonance peak as shown in FIG. 4 appears, which means a pretty poor tone quality.

It should be made clear that, the above detailed description of the better implement examples should not be considered as the limitations to the present disclosure protections. The extent of the patent protection of the present disclosure should be determined by the terms of claims.

EXAMPLES

Example 1

A bone conduction speaker may include a U-shaped headset bracket/headset lanyard, two vibration units, a transducer connected to each vibration unit. The vibration unit may include a contact surface and a housing. The contact surface may be an outer surface of a silicone rubber transfer layer and may be configured to have a gradient structure including a convex portion. A clamping force between the contact surface and skin due to the headset bracket/headset lanyard may be unevenly distributed on the contact surface. The sound transfer efficiency of the portion of the gradient structure may be different from the portion without the gradient structure.

Example 2

This example may be different from Example 1 in the following aspects. The headset bracket/headset lanyard as described may include a memory alloy. The headset bracket/headset lanyard may match the curves of different users' heads and have a good elasticity and a better wearing comfort. The headset bracket/headset lanyard may recover to its original shape from a deformed status last for a certain period. As used herein, the certain period may refer to ten minutes, thirty minutes, one hour, two hours, five hours, or may also refer to one day, two days, ten days, one month, one year, or a longer period. The clamping force that the headset bracket/headset lanyard provides may keep stable, and may not decline gradually over time. The force intensity between the bone conduction speaker and the body surface of a user may be within an appropriate range, so as to avoid pain or clear vibration sense caused by undue force when the user wears the bone conduction speaker. Moreover, the clamping force of bone conduction speaker may be within a range of 0.2N~1.5N when the bone conduction speaker is used.

Example 3

The difference between this example and the two examples mentioned above may include the following aspects. The elastic coefficient of the headset bracket/headset lanyard may be kept in a specific range, which results in the value of the frequency response curve in low frequency (e.g., under 500 Hz) being higher than the value of the frequency response curve in high frequency (e.g., above 4000 Hz).

Example 4

The difference between Example 4 and Example 1 may include the following aspects. The bone conduction speaker may be mounted on an eyeglass frame, or in a helmet or mask with a special function.

Example 5

The difference between this example and Example 1 may include the following aspects. The vibration unit may include two or more panels, and the different panels or the vibration transfer layers connected to the different panels may have different gradient structures on a contact surface being in contact with a user. For example, one contact surface may have a convex portion, the other one may have a concave structure, or the gradient structures on both the two contact surfaces may be convex portions or concave structures, but there may be at least one difference between the shape or the number of the convex portions.

Example 6

A portable bone conduction hearing aid may include multiple frequency response curves. A user or a tester may choose a proper response curve for hearing compensation according to an actual response curve of the auditory system of a person. In addition, according to an actual requirement, a vibration unit in the bone conduction hearing aid may enable the bone conduction hearing aid to generate an ideal frequency response in a specific frequency range, such as 500 Hz-4000 Hz.

Example 7

A vibration generation portion of a bone conduction speaker may be shown in FIG. 9-A. A transducer of the bone conduction speaker may include a magnetic circuit system including a magnetic flux conduction plate 910, a magnet 911 and a magnetizer 912, a vibration board 914, a coil 915, a first vibration conductive plate 916, and a second vibration conductive plate 917. The panel 913 may protrude out of the housing 919 and may be connected to the vibration board 914 by glue. The transducer may be fixed to the housing 919 via the first vibration conductive plate 916 forming a suspended structure.

A compound vibration system including the vibration board 914, the first vibration conductive plate 916, and the second vibration conductive plate 917 may generate a smoother frequency response curve, so as to improve the sound quality of the bone conduction speaker. The transducer may be fixed to the housing 919 via the first vibration conductive plate 916 to reduce the vibration that the transducer is transferring to the housing, thus effectively decreasing sound leakage caused by the vibration of the housing, and reducing the effect of the vibration of the housing on the sound quality. FIG. 9-B shows frequency response curves of the vibration intensities of the housing of the vibration generation portion and the panel. The bold line refers to the frequency response of the vibration generation portion including the first vibration conductive plate 916, and the thin line refers to the frequency response of the vibration generation portion without the first vibration conductive plate 916. As shown in FIG. 9-B, the vibration intensity of the housing of the bone conduction speaker without the first vibration conductive plate may be larger than that of the bone conduction speaker with the first vibration conductive plate when the frequency is higher than 500 Hz. FIG. 9-C shows a comparison of the sound leakage between a bone conduction speaker includes the first vibration conductive plate 916 and another bone conduction speaker does not include the first vibration conductive plate 916. The sound leakage when the bone conduction speaker includes the first vibration conductive plate may be smaller than the sound leakage when the bone conduction speaker does not include the first vibration conductive plate in the intermediate frequency range (for example, about 1000 Hz). It can be concluded that the use of the first vibration conductive plate between the panel and the housing may effectively reduce the vibration of the housing, thereby reducing the sound leakage.

The first vibration conductive plate may be made of the material, for example but not limited to stainless steel, copper, plastic, polycarbonate, or the like, and the thickness may be in a range of 0.01 mm-1 mm.

Example 8

Figure 10:
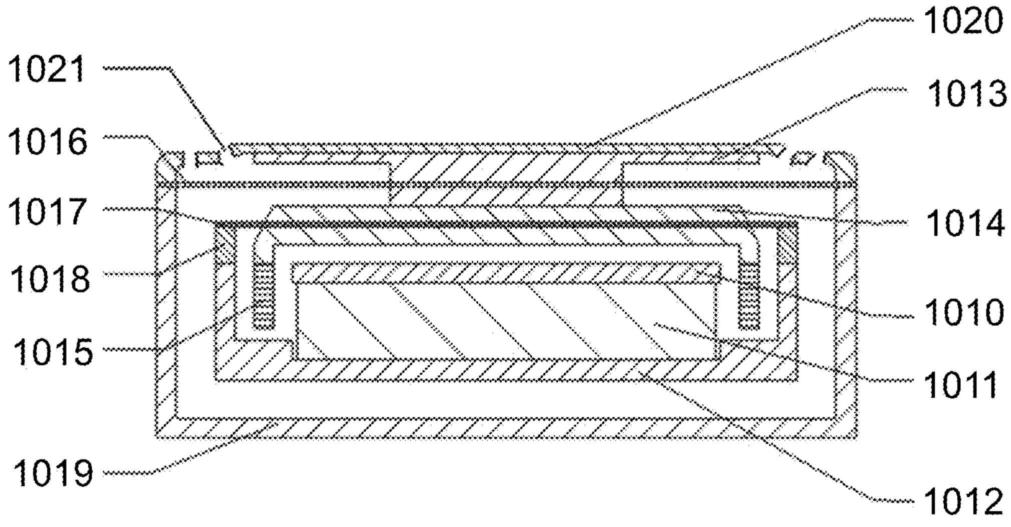
FIG. 10 illustrates a structure of the vibration generation portion of the bone conduction speaker according to one specific embodiment of the present disclosure.

This example may be different with Example 7 in the following aspects. As shown in FIG. 10, the panel 1013 may be configured to have a vibration transfer layer 1020 (for example but not limited to, silicone rubber) to produce a certain deformation to match a user's skin. A contact portion being in contact with the panel 1013 on the vibration transfer layer 1020 may be higher than a portion not being in contact with the panel 1013 on the vibration transfer layer 1020 to form a step structure. The portion not being in contact with the panel 1013 on the vibration transfer layer 1020 may be configured to have one or more holes 1021. The holes on the vibration transfer layer may reduce the sound leakage: the connection between the panel 1013 and the housing 1019 via the vibration transfer layer 1020 may be weakened, and vibration transferred from panel 1013 to the housing 1019 via the vibration transfer layer 1020 may be reduced, thereby reducing the sound leakage caused by the vibration of the housing; the area of the vibration transfer layer 1020 configured to have holes on the portion without protrusion may be reduced, thereby reducing air and sound leakage caused by the vibration of the air; the vibration of air in the housing may be guided out, interfering with the vibration of air caused by the housing 1019, thereby reducing the sound leakage.

Example 9

The difference between this example and Example 7 may include the following aspects. As the panel may protrude out of the housing, meanwhile, the panel may be connected to the housing via the first vibration conductive plate, the degree of coupling between the panel and the housing may be dramatically reduced, and the panel may be in contact with a user with a higher freedom to adapt complex contact surfaces (as shown in the right figure of FIG. 11-A) as the first vibration conductive plate provides a certain amount of deformation. The first vibration conductive plate may incline the panel relative to the housing with a certain angle. Preferably, the slope angle may not exceed 5 degrees.

The vibration efficiency may differ with contacting statuses. A better contacting status may lead to a higher vibration transfer efficiency. As shown in FIG. 11-B, the bold line shows the vibration transfer efficiency with a better contacting status, and the thin line shows a worse contacting status. It may be concluded that the better contacting status may correspond to a higher vibration transfer efficiency.

Example 10

Figure 12:
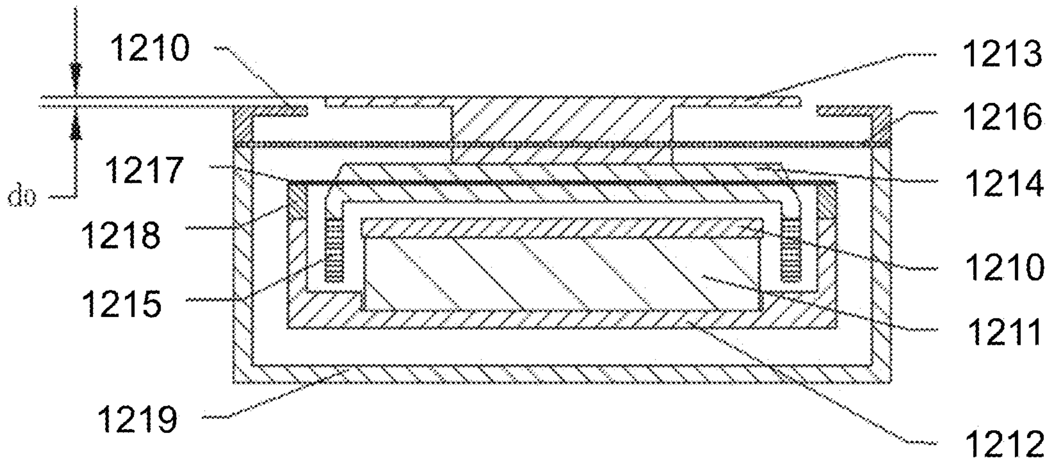
FIG. 12 illustrates a structure of the vibration generation portion of the bone conduction speaker according to one specific embodiment of the present disclosure.

The difference between this example and Example 7 may include the following aspects. A boarder may be added to surround the housing. When the housing contact with a user's skin, the surrounding boarder may facilitate an even distribution of an applied force, and improve the user's wearing comfort. As shown in FIG. 12, there may be a height difference do between the surrounding border 1210 and the panel 1213. The force from the skin to the panel 1213 may decrease the distance d between the panel 1213 and the surrounding border 1210. When the force between the bone conduction speaker and the user is larger than the force applied to the first vibration conductive plate with a deformation of do, the extra force may be transferred to the user's skin via the surrounding border 1210, without influencing the clamping force of the vibration portion, with the consistency of the clamping force improved, thereby ensuring the sound quality.

Example 11

Figure 13:
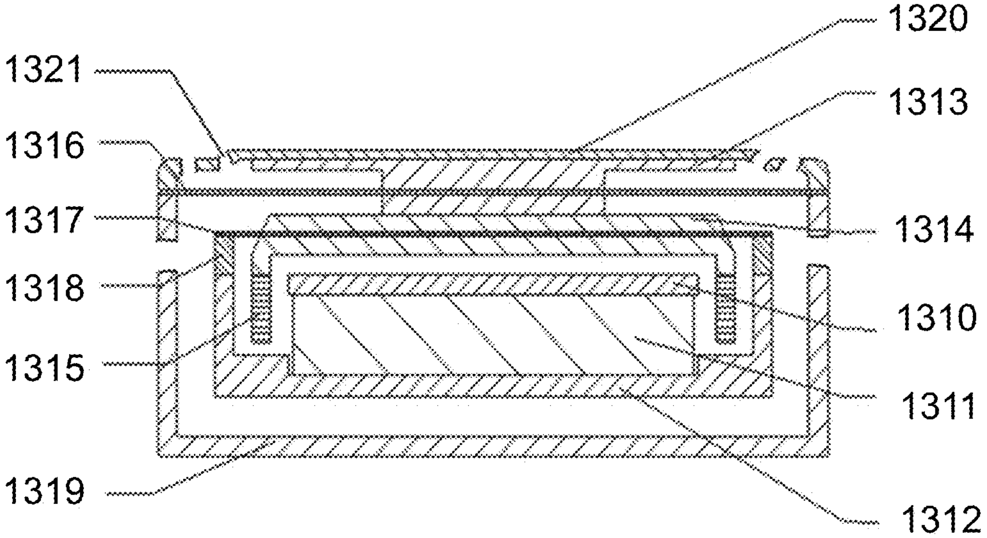
FIG. 13 illustrates a structure of the vibration generation portion of the bone conduction speaker according to one specific embodiment of the present disclosure.

The difference between this example and Example 8 may include the following aspects. As shown in FIG. 13, sound guiding holes are located at the vibration transfer layer 1320 and the housing 1319, respectively. The acoustic wave formed by the vibration of the air in the housing is guided to the outside of the housing, and interferes with the leaked acoustic wave due to the vibration of the air out of the housing, thus reducing the sound leakage.

In some embodiments, an environmental sound collection and processing function may be added to a speaker as described elsewhere in the present disclosure, e.g., to enable the speaker to implement the function of a hearing aid, or to collect the voice of the user/wearer to enable voice communication with others. For example, an electronic component including a microphone may be added to the speaker. The microphone may collect environmental sounds of a user/wearer, process the sounds using an algorithm and transmit the processed sound (or generated electrical signal) to the user/wearer of the speaker. That is, the speaker may be modified to include the function of collecting the environmental sounds, and after a signal processing, the sound may be transmitted to the user/wearer via the speaker, thereby implementing the function of the hearing aid. The algorithm mentioned herein may include noise cancellation, automatic gain control, acoustic feedback suppression, wide dynamic range compression, active environment recognition, active noise reduction, directional processing, tinnitus processing, multi-channel wide dynamic range compression, active howling suppression, volume control, or the like, or any combination thereof.

Figure 14:
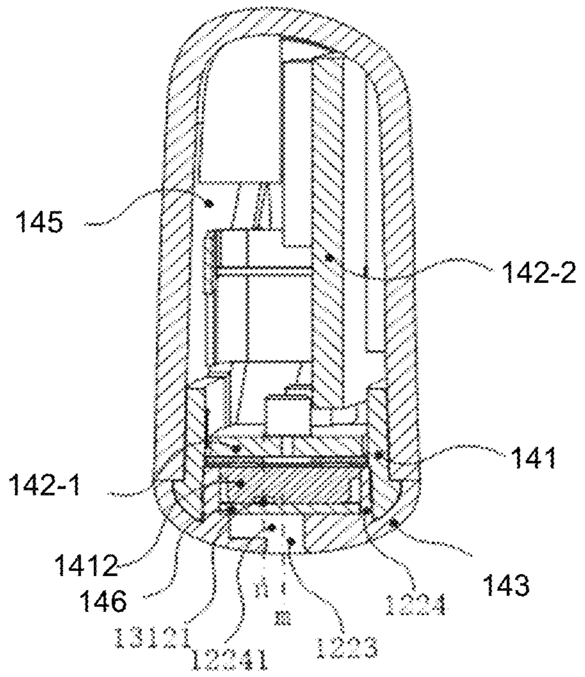
FIG. 14 is a sectional view illustrating an electronic component according to some embodiments of the present disclosure.

FIG. 14 is a sectional view illustrating an electronic component according to the present disclosure. The electronic component may be a portion of a speaker described elsewhere in the present disclosure. As shown in FIG. 14, the electronic component may include a first microphone element 1412, a bracket 141, a circuit component (e.g., including a first circuit board 142-1, a second circuit board 142-2), a cover layer 143, a chamber 145, etc. As used herein, the bracket 141 may be used to physically connect to an accommodation body of the speaker. The cover layer 143 may integrally form on the surface of the bracket 141 by injection molding to provide a seal for the chamber 145 after the bracket 141 is connected to the accommodation body. In some embodiments, the first microphone element 1412 may be disposed on the first circuit board 142-1 of the circuit component to be accommodated inside the chamber 145. The first microphone element 1412 may be used to receive a sound signal from the outside of the electronic component, and convert the sound signal into an electrical signal for analysis and processing. In some embodiments, the first microphone element 1412 may also be referred to as a microphone 1412 for brevity.

In some embodiments, the bracket 141 may be disposed with a microphone hole corresponding to the first microphone element 1412. The cover layer 143 may be disposed with a first sound guiding hole 1223 corresponding to the microphone hole. A first sound blocking member 1224 may be disposed at a position corresponding to the microphone hole. The first sound blocking member 1224 may extend towards the inside of the chamber 145 via the microphone hole and define a sound guiding channel 12241. One end of the sound guiding channel 12241 may be in communication with the first sound guiding hole 1223 of the cover layer 143. The first microphone element 1412 may be inserted into the sound guiding channel 12241 from another end of the sound guiding channel 12241.

In some embodiments, the electronic component may also include a switch in the embodiment. The circuit component may be disposed with the switch. The switch may be disposed on an outer side of the first circuit board 142-1 towards an opening of the chamber 145. Correspondingly, the bracket 141 may be disposed with a switch hole corresponding to the switch. The cover layer 143 may further cover the switch hole. The switch hole and the microphone hole may be disposed on the bracket 141 at intervals.

In some embodiments, the first sound guiding hole 1223 may be disposed through the cover layer 143 and correspond to the position of the first microphone element 1412. The first sound guiding hole 1223 may correspond to the microphone hole of the bracket 141, and further communicate the first microphone element 1412 with the outside of the electronic component. Therefore, a sound from the outside of the electronic component may be received by the first microphone element 1412 via the first sound guiding hole 1223 and the microphone hole.

The shape of the first sound guiding hole 1223 may be any shape as long as the sound from the outside of the electronic component is able to be received by the electronic component. In some embodiments, the first sound guiding hole 1223 may be a circular hole having a relatively small size, and disposed in a region of the cover layer 143 corresponding to the microphone hole. The first sound guiding hole 1223 with the small size may limit the communication between the first microphone element 1412 or the like in the electronic component and the outside, thereby improving the sealing of the electronic component.

In some embodiments, the first sound blocking member 1224 may extend to the periphery of the first microphone element 1412 from the cover layer 143, through the periphery of the first sound guiding hole 1223, the microphone hole and the inside of the chamber 145 to form the sound guiding channel 12241 from the first sound guiding hole 1223 to the first microphone element 1412. Therefore, the sound signal of the electronic component entering the sound guiding hole may directly reach the first microphone element 1412 through the sound guiding channel 12241.

In some embodiments, a shape of the sound guiding channel 12241 in a section perpendicular to the length direction may be the same as or different from the shape of the microphone hole or the first microphone element 1412. In some embodiments, the sectional shapes of the microphone hole and the first microphone element 1412 in a direction perpendicular to the bracket 141 towards the chamber 145 may be square. The size of the microphone hole may be slightly larger than the outer size of the sound guiding channel 12241. The inner size of the sound guiding channel 12241 may not be less than the outer size of the first microphone element 1412. Therefore, the sound guiding channel 12241 may pass through the first sound guiding hole 1223 to reach the first microphone element 1412 and be wrapped around the periphery of the first microphone element 1412.

Through the way described above, the cover layer 143 of the electronic component may be disposed with the first sound guiding hole 1223 and the sound guiding channel 12241 passing from the periphery of the first sound guiding hole 1223 through the microphone hole to reach the first microphone element 1412 and wrapped around the periphery of the first microphone element 1412. The sound guiding channel 12241 may be disposed so that the sound signal entering through the first sound guiding hole 1223 may reach the first microphone element 1412 via the first sound guiding hole 1223 and be received by the first microphone element 1412. Therefore, the leakage of the sound signal in the transmission process may be reduced, thereby improving the efficiency of receiving the electronic signal by the electronic component.

In some embodiments, the electronic component may also include a waterproof mesh cloth 146 disposed inside the sound guiding channel 12241. The waterproof mesh cloth 146 may be held against the side of the cover layer 143 towards the microphone element by the first microphone element 1412 and cover the first sound guiding hole 1223.

In some embodiments, the bracket 141 may protrude at a position of the bracket 141 close to the first microphone element 1412 in the sound guiding channel 12241 to form a convex surface opposite to the first microphone element 1412. Therefore, the waterproof mesh cloth 146 may be sandwiched between the first microphone element 1412 and the convex surface, or directly adhered to the periphery of the first microphone element 1412, and the specific setting manner may not be limited herein.

In addition to the waterproof function for the first microphone element 1412, the waterproof mesh cloth 146 in the embodiment may also have a function of sound transmission, etc., to avoid adversely affecting the sound receiving effect of a sound receiving region 13121 of the first microphone element 1412.

In some embodiments, the cover layer 143 may be arranged in a stripe shape. As used herein, a main axis of the first sound guiding hole 1223 and a main axis of the sound receiving region 13121 of the first microphone element 1412 may be spaced from each other in the width direction of the cover layer 143. As used herein, the main axis of the sound receiving region 13121 of the first microphone element 1412 may refer to a main axis of the sound receiving region 13121 of the first microphone element 1412 in the width direction of the cover layer 143, such as an axis n in FIG. 14. The main axis of the first sound guiding hole 1223 may be an axis m in FIG. 14.

It should be noted that, due to the setting requirements of the circuit component, the first microphone element 1412 may be disposed at a first position of the first circuit board 142-1. When the first sound guiding hole 1223 is disposed, the first sound guiding hole 1223 may be disposed at a second position of the cover layer 143 due to the aesthetic and convenient requirements. In the embodiment, the first position and the second position may not correspond in the width direction of the cover layer 143. Therefore, the main axis of the first sound guiding hole 1223 and the main axis of the sound receiving region 13121 of the first microphone element 1412 may be spaced from each other in the width direction of the cover layer 143. Therefore, the sound input via the first sound guiding hole 1223 may not reach the sound receiving region 13121 of the first microphone element 1412 along a straight line.

In some embodiments, in order to guide the sound signal entered from the first sound guiding hole 1223 to the first microphone element 1412, the sound guiding channel 12241 may be disposed with a curved shape.

In some embodiments, the main axis of the first sound guiding hole 1223 may be disposed in the middle of the cover layer 143 in the width direction of the cover layer 143.

In some embodiments, the cover layer 143 may be a portion of the outer housing of the electronic device. In order to meet the overall aesthetic requirements of the electronic device, the first sound guiding hole 1223 may be disposed in the middle in the width direction of the cover layer 143. Therefore, the first sound guiding hole 1223 may look more symmetrical and meet the visual requirements of people.

In some embodiments, the corresponding sound guiding channel 12241 may be disposed with a stepped shape in a section. Therefore, the sound signal introduced by the first sound guiding hole 1223 may be transmitted to the first microphone element 1412 through the stepped sound guiding channel 12241 and received by the first microphone element 1412.

Figure 15:
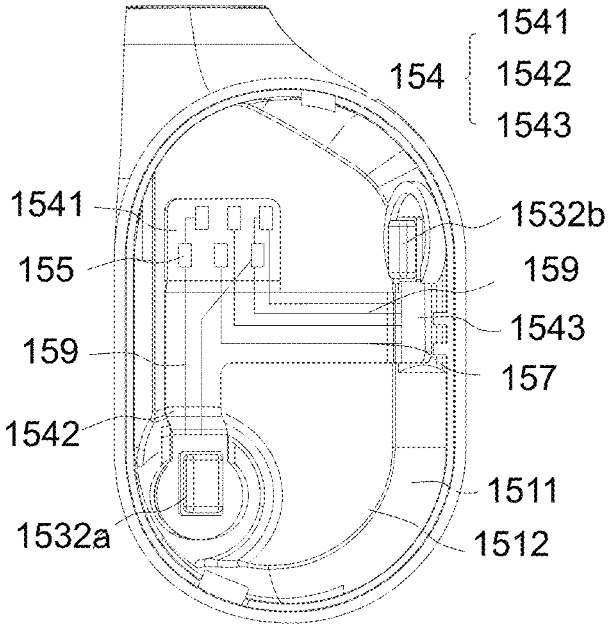
FIG. 15 is a partial structural diagram illustrating a speaker according to some embodiments of the present disclosure.
Figure 16:
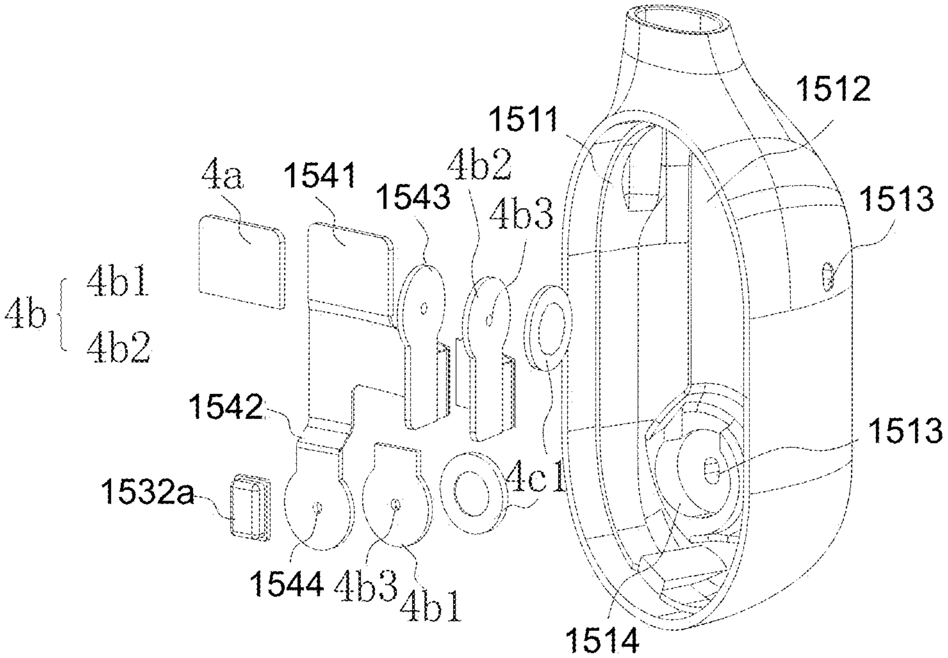
FIG. 16 is an exploded view illustrating a partial structure of a speaker according to some embodiments of the present disclosure.
Figure 17:
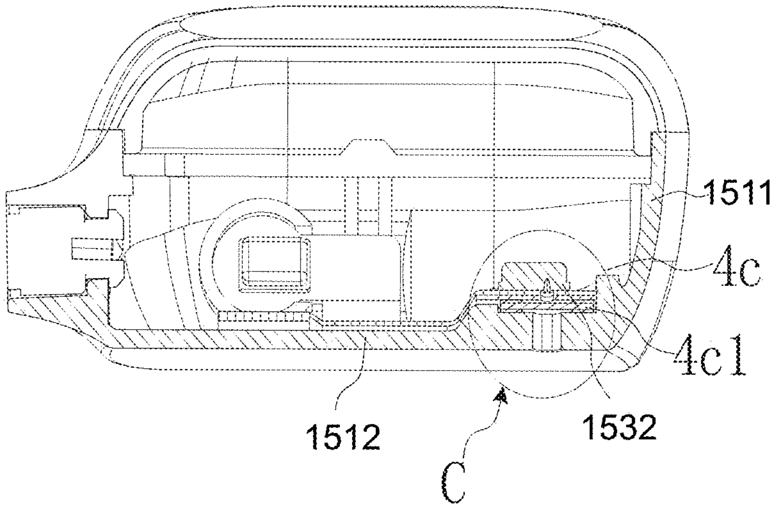
FIG. 17 is a sectional view illustrating a partial structure of a speaker according to some embodiments of the present disclosure.

FIG. 15 is a partial structural diagram illustrating a speaker according to an embodiment of the present disclosure. FIG. 16 is an exploded diagram illustrating a partial structure of a speaker according to an embodiment of the present disclosure. FIG. 17 is a sectional view illustrating a partial structure of a speaker according to an embodiment of the present disclosure. The speaker described herein may be similar to a speaker described elsewhere in the present disclosure. It should be noted that, without departing from the spirit and scope of the present disclosure, the contents described below may be applied to an air conduction speaker and a bone conduction speaker.

Referring to FIG. 15 and FIG. 16, in some embodiments, the speaker may include one or more microphones. The number (or count) of the microphones may include two, i.e., a first microphone 1532*a* and a second microphone 1532*b*. As used herein, the first microphone 1532*a* and the second microphone 1532*b* may both be MEMS (micro-electromechanical system) microphones which may have a small working current, relatively stable performance, and high voice quality. The two microphones may be disposed at different positions of a flexible circuit board 154 according to actual requirements.

In some embodiments, the flexible circuit board 154 may be disposed in the speaker. The flexible circuit board 154 may include a main circuit board 1541, and a branch circuit board 1542 and a branch circuit board 1543 connected to the main circuit board 1541. The branch circuit board 1542 may extend in the same direction as the main circuit board 1541. The first microphone 1532*a* may be disposed on one end of the branch circuit board 1542 away from the main circuit board 1541. The branch circuit board 1543 may extend perpendicular to the main circuit board 1541. The second microphone 1532*b* may be disposed on one end of the branch circuit board 1543 away from the main circuit board 1541. A plurality of pads 155 may be disposed on the end of the main circuit board 1541 away from the branch circuit board 1542 and the branch circuit board 1543. The one or more microphones may be connected to the main circuit board 1541 by one or more wires (e.g., a wire 157, a wire 159, etc.).

In some embodiments, a core housing (also referred to as a housing for brevity (e.g., the housing 909, the housing 1019, etc. illustrated in the embodiments above)) may include a peripheral side wall 1511 and a bottom end wall 1512 connected to one end surface of the peripheral side wall 1511 to form an accommodation space with an open end. As used herein, an earphone core may be placed in the accommodation space through the open end. The first microphone 1532*a* may be fixed on the bottom end wall 1512. The second microphone 1532*b* may be fixed on the peripheral side wall 1511.

In some embodiments, the branch circuit board 1542 and/or the branch circuit board 1543 may be appropriately bent to suit a position of a sound inlet corresponding to the microphone at the core housing. Specifically, the flexible circuit board 154 may be disposed in the core housing in a manner that the main circuit board 1541 is parallel to the bottom end wall 1512. Therefore, the first microphone 1532*a* may correspond to the bottom end wall 1512 without bending the main circuit board 1541. Since the second microphone 1532*b* may be fixed to the peripheral side wall 1511 of the core housing, it may be necessary to bend the main circuit board 1541. Specifically, the branch circuit board 1543 may be bent at one end away from the main circuit board 1541 so that a board surface of the branch circuit board 1543 may be perpendicular to a board surface of the main circuit board 1541 and the branch circuit board 1542. Further, the second microphone 1532*b* may be fixed at the peripheral side wall 1511 of the core housing in a direction facing away from the main circuit board 1541 and the branch circuit board 1542.

In some embodiments, a pad 155, a pad 156 (not shown in figures), the first microphone 1532*a*, and the second microphone 1532*b* may be disposed on the same side of the flexible circuit board 154. The pad 156 may be disposed adjacent to the second microphone 1532*b*.

In some embodiments, the pad 156 may be specifically disposed at one end of the branch circuit board 1543 away from the main circuit board 1541, and have the same orientation as the second microphone 1532*b* and disposed at intervals. Therefore, the pad 156 may be perpendicular to the orientation of the pad 155 as the branch circuit board 1543 is bent. It should be noted that the board surface of the branch circuit board 1543 may not be perpendicular to the board surface of the main circuit board 1541 after the branch circuit board 1543 is bent, which may be determined according to the arrangement between the peripheral side wall 1511 and the bottom end wall 1512.

In some embodiments, another side of the flexible circuit board 154 may be disposed with a rigid support plate 4*a* and a microphone rigid support plate 4*b* for supporting the pad 155. The microphone rigid support plate 4*b* may include a rigid support plate 4*b*1 for supporting the first microphone 1532*a* and a rigid support plate 4*b*2 for supporting the pad 156 and the second microphone 1532*b* together.

In some embodiments, the rigid support plate 4*a*, the rigid support plate 4*b*1, and the rigid support plate 4*b*2 may be mainly used to support the corresponding pads and the microphone, and thus may need to have strengths. The materials of the three may be the same or different. The specific material may be polyimide (PI), or other materials that may provide the strengths, such as polycarbonate, polyvinyl chloride, etc. In addition, the thicknesses of the three rigid support plates may be set according to the strengths of the rigid support plates and actual strengths required by the pad 155, the pad 156, the first microphone 1532*a*, and the second microphone 1532*b*, and be not specifically limited herein.

The first microphone 1532*a* and the second microphone 1532*b* may correspond to two microphone components 4*c*, respectively. In some embodiments, the structures of the two microphone components 4*c* may be the same. A sound inlet 1513 may be disposed on the core housing. Further, the speaker may be further disposed with an annular blocking wall 1514 integrally formed on the inner surface of the core housing, and disposed at the periphery of the sound inlet 1513, thereby defining an accommodation space 1515 connected to the sound inlet 1513.

Referring to FIG. 15, FIG. 16, and FIG. 17, in some embodiments, the microphone component 4*c* may further include a waterproof membrane component 4*c*1.

As used herein, the waterproof membrane component 4*c*1 may be disposed inside the accommodation space 1515 and cover the sound inlet 1513. The microphone rigid support plate 4*b* may be disposed inside the accommodation space 1515 and located at one side of the waterproof membrane component 4*c*1 away from the sound inlet 1513. Therefore, the waterproof membrane component 4*c*1 may be pressed on the inner surface of the core housing. In some embodiments, the microphone rigid support plate 4*b* may be disposed with a sound inlet 4*b*3 corresponding to the sound inlet 1513. In some embodiments, the microphone may be disposed on one side of the microphone rigid support plate 4*b* away from the waterproof membrane component 4*c*1 and cover the sound inlet 4*b*3.

As used herein, the waterproof membrane component 4*c*1 may have functions of waterproofing and transmitting the sound, and closely attached to the inner surface of the core housing to prevent the liquid outside the core housing entering the core housing via the sound inlet 1513 and affect the performance of the microphone.

The axial directions of the sound inlet 4*b*3 and the sound inlet 1513 may overlap, or intersect at an angle according to actual requirements of the microphone, etc.

The microphone rigid support plate 4*b* may be disposed between the waterproof membrane component 4*c*1 and the microphone. On the one hand, the waterproof membrane component 4*c*1 may be pressed so that the waterproof membrane component 4*c*1 may be closely attached to the inner surface of the core housing. On the other hand, the microphone rigid support plate 4*b* may have a strength, thereby playing the role of supporting the microphone.

In some embodiments, the material of the microphone rigid support plate 4*b* may be polyimide (PI), or other materials capable of providing the strength, such as polycarbonate, polyvinyl chloride, or the like. In addition, the thickness of the microphone rigid support plate 4*b* may be set according to the strength of the microphone rigid support plate 4*b* and the actual strength required by the microphone, and be not specifically limited herein.

Figure 18:
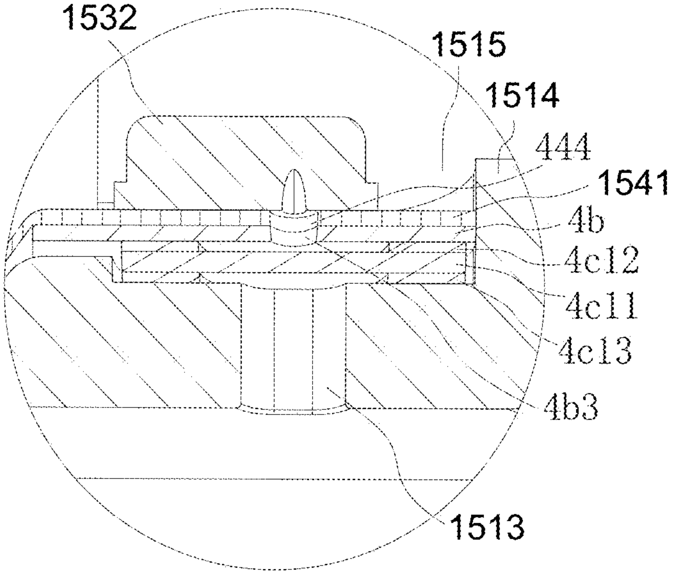
FIG. 18 is a partial enlarged view illustrating part C in FIG. 17 according to some embodiments of the present disclosure.

FIG. 18 is a partially enlarged view illustrating part C in FIG. 17 according to some embodiments of the present disclosure. As shown in FIG. 18, in some embodiments, the waterproof membrane component 4*c*1 may include a waterproof membrane body 4*c*11 and an annular rubber gasket 4*c*12. The annular rubber gasket 4*c*12 may be disposed at one side of the waterproof membrane body 4*c*11 towards the microphone rigid support plate 4*b*, and further disposed on the periphery of the sound inlet 1513 and the sound inlet 4*b*3.

As used herein, the microphone rigid support plate 4*b* may be pressed against the annular rubber gasket 4*c*12. Therefore, the waterproof membrane component 4*c*1 and the microphone rigid support plate 4*b* may be adhered and fixed together.

In some embodiments, the annular rubber gasket 4*c*12 may be arranged to form a sealed chamber communicating with the microphone and only through the sound inlet 4*b*3 between the waterproof membrane body 4*c*11 and the rigid support plate. That is, there may be no gap in a connection between the waterproof membrane component 4*c*1 and the microphone rigid support plate 4*b*. Therefore, a space around the annular rubber gasket **4*c*12 between the waterproof membrane body 4*c*11 and the microphone rigid support plate 4*b* may be isolated from the sound inlet 4*b*3**.

In some embodiments, the waterproof membrane body **4*c*11 may be a waterproof and sound-transmitting membrane and be equivalent to a human eardrum. When an external sound enters via the sound inlet 1513, the waterproof membrane body 4*c*11** may vibrate, thereby changing an air pressure in the sealed chamber and generating a sound in the microphone.

Further, since the waterproof membrane body **4*c*11 may change the air pressure in the sealed chamber during the vibration, the air pressure may need to be controlled within an appropriate range. If it is too large or too small, it may affect the sound quality. In the embodiment, a distance between the waterproof membrane body 4*c*11 and the rigid support plate may be 0.1-0.2 mm, specifically 0.1 mm, 0.15 mm, 0.2 mm, etc. Therefore, the change of the air pressure in the sealed chamber during the vibration of the waterproof film body 4*c*11** may be within the appropriate range, thereby improving the sound quality.

In some embodiments, the waterproof membrane component **4*c*1 may further include an annular rubber gasket 4*c*13 disposed on the waterproof membrane body 4*c*11 towards the inner surface side of the core housing and overlapping the annular rubber gasket 4*c*12**.

In this way, the waterproof membrane component **4*c*1 may be closely attached to the inner surface of the core housing at the periphery of the sound inlet 1513, thereby reducing the loss of the sound entered via the sound inlet 1513, and improving a conversion rate of converting the sound into the vibration of the waterproof membrane body 4*c*11**.

In some embodiments, the annular rubber gasket **4*c*12 and the annular rubber gasket 4*c*13** may be a double-sided tape, a sealant, etc., respectively.

In some embodiments, the sealant may be further coated on the peripheries of the annular blocking wall 1514 and the microphone to further improve the sealing, thereby improving the conversion rate of the sound and the sound quality.

In some embodiments, the flexible circuit board 154 may be disposed between the rigid support plate and the microphone. A sound inlet 1544 may be disposed at a position corresponding to the sound inlet **4*b*3 of the microphone rigid support plate 4*b*. Therefore, the vibration of the waterproof membrane body 4*c*11 generated by the external sound may pass through the sound inlet 1544**, thereby further affecting the microphone.

Referring to FIG. 16, in some embodiments, the flexible circuit board 154 may further extend away from the microphone, so as to be connected to other functional components or wires to implement corresponding functions. Correspondingly, the microphone rigid support plate **4*b*** may also extend out a distance with the flexible circuit board in a direction away from the microphone.

Correspondingly, the annular blocking wall 1514 may be disposed with a gap matching the shape of the flexible circuit board to allow the flexible circuit board to extend from the accommodation space 1515. In addition, the gap may be further filled with the sealant to further improve the sealing.

It should be noted that the above description of the microphone waterproof is only a specific example, and should not be considered as the only feasible implementation. Obviously, for those skilled in the art, after understanding the basic principles of microphone waterproofing, it is possible to make various modifications and changes in the form and details of the specific method and step of implementing the microphone waterproof without departing from this principle, but these modifications and changes are still within the scope described above. For example, the count of the sound inlets 1513 may be set as one or multiple. All such modifications are within the protection scope of the present disclosure.

The embodiments described above are merely implements of the present disclosure, and the descriptions may be specific and detailed, but these descriptions may not limit the present disclosure. It should be noted that those skilled in the art, without deviating from concepts of the bone conduction speaker, may make various modifications and changes to, for example, the sound transfer approaches described in the specification, but these combinations and modifications are still within the scope of the present disclosure.

What is claimed is:

1. A speaker, comprising:

a housing;

compound vibration parts residing inside the housing and configured to generate vibrations to produce a sound wave inside the housing, wherein the compound vibration parts include two or more vibration parts at least partially attached to each other, and at least one hole located on the housing and configured to guide the sound wave inside the housing to an outside of the housing;

a panel connected with the compound vibration parts;

a vibration transfer layer, a portion of the vibration transfer layer being in contact with the panel, and a portion not being in contact with the panel on the vibration transfer layer having one or more holes configured to guide the sound wave inside the housing to the outside of the housing;

at least two microphones, the at least two microphones including a first microphone with a first orientation and a second microphone with a second orientation different from the first orientation.

2. The speaker according to claim 1, wherein at least two of the two or more vibration parts having different stiffness coefficients.

3. The speaker according to claim 1, wherein the two or more vibration parts overlap each other.

4. The speaker according to claim 1, wherein a thickness of at least one of the two or more vibration parts is in a range of 0.02 mm-0.5 mm.

5. The speaker according to claim 1, wherein the first microphone and the second microphone are disposed at different positions of a flexible circuit board, wherein the flexible circuit board is disposed in the speaker.

6. The speaker according to claim 5, wherein the flexible circuit board includes a main circuit board, a first branch circuit board, and a second branch circuit board, wherein the first branch circuit board and the second branch circuit board are connected to the main circuit board.

7. The speaker according to claim 6, wherein the second branch circuit board extends perpendicular to the main circuit board.

8. The speaker according to claim 7, wherein the second microphone is disposed on one end of the second branch circuit board away from the main circuit board.

9. The speaker according to claim 6, wherein the first microphone is disposed on one end of the first branch circuit board away from the main circuit board.

10. The speaker according to claim 5, wherein the first microphone and the second microphone are disposed on a first side of the flexible circuit board.

11. The speaker according to claim 10, wherein a microphone rigid support plate is disposed on a second side of the flexible circuit board, the second side being different from the first side.

12. The speaker according to claim 11, wherein the microphone rigid support plate includes a first rigid support plate for supporting the first microphone and a second rigid support plate for supporting the second microphone.

13. The speaker according to claim 1, wherein the housing includes a peripheral side wall and a bottom end wall, wherein the first microphone is fixed on the bottom end wall, and the second microphone is fixed on the peripheral side wall.

14. The speaker according to claim 1, further comprising a voice coil, wherein the voice coil is driven by a magnetic component and fixed on at least part of the two or more vibration parts.

15. The speaker according to claim 14, wherein the magnetic component comprises:

a bottom plate;

an annular magnet attaching to the bottom plate;

an inner magnet concentrically disposed inside the annular magnet;

an inner magnetic conductive plate attaching to the inner magnet;

an annular magnetic conductive plate attaching to the annular magnet; and a grommet attaching to the annular magnetic conductive plate.

16. The speaker according to claim 1, wherein the vibrations causes a leaked sound wave spreading outside the housing; and the guided sound wave through the at least one hole interferes with the leaked sound wave.

17. The speaker according to claim 1, wherein the at least one hole on the housing includes at least two holes.

18. The speaker according to claim 1, wherein the portion being in contact with the panel on the vibration transfer layer is higher than the portion not being in contact with the panel on the vibration transfer layer to form a step structure.

19. The speaker according to claim 1, wherein the compound vibration parts and the vibration transfer layer are located on opposite sides of the panel.

20. The speaker according to claim 1, wherein the vibration transfer layer is configured to produce a certain deformation to match a user's skin; and the vibrations are transferred to human bones through the panel.

* * * * *